(12) United States Patent
Nishijima

(10) Patent No.: US 9,673,727 B2
(45) Date of Patent: Jun. 6, 2017

(54) SWITCHING POWER SUPPLY CONTROL CIRCUIT AND SWITCHING POWER SUPPLY

(71) Applicant: FUJI ELECTRIC CO., LTD., Kawasaki-shi, Kanagawa (JP)

(72) Inventor: Kenichi Nishijima, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/176,307

(22) Filed: Jun. 8, 2016

(65) Prior Publication Data

US 2017/0033707 A1 Feb. 2, 2017

(30) Foreign Application Priority Data

Jul. 31, 2015 (JP) ................................. 2015-151798

(51) Int. Cl.
<table><tr><td>G05F 1/00</td><td>(2006.01)</td></tr><tr><td>H02M 7/06</td><td>(2006.01)</td></tr><tr><td>H02M 1/44</td><td>(2007.01)</td></tr><tr><td>H02M 1/36</td><td>(2007.01)</td></tr><tr><td>H02M 1/08</td><td>(2006.01)</td></tr><tr><td>H02M 1/00</td><td>(2006.01)</td></tr></table>

(52) U.S. Cl.
CPC ............. *H02M 7/06* (2013.01); *H02M 1/08* (2013.01); *H02M 1/36* (2013.01); *H02M 1/44* (2013.01); *H02M 2001/0009* (2013.01)

(58) Field of Classification Search
CPC ........ G05F 1/462; G05F 1/467; H02M 1/143; H02M 3/157
USPC .......................... 323/241–243, 283, 284, 288
See application file for complete search history.

(56) References Cited

U.S. PATENT DOCUMENTS

2008/0077337 A1 3/2008 Yoshinaga
2011/0110126 A1* 5/2011 Morrish .................. H02M 1/44
363/21.18
(Continued)

FOREIGN PATENT DOCUMENTS

JP 2003-150660 A 5/2003
WO WO-2006/019196 A1 2/2006

OTHER PUBLICATIONS

Tomonori Yamada et al., "Estimation of the EMI Reduction by Spread Spectrum Clock", The Institute of Electronics, Information and Communication Engineers (IEICE) Technical Report, Engineering Sciences Society IEICE, vol. 101, No. 530, pp. 37-42, Dec. 14, 2001.

*Primary Examiner* — Adolf Berhane
*Assistant Examiner* — Gary Nash
(74) *Attorney, Agent, or Firm* — Rabin & Berdo, P.C.

(57) ABSTRACT

A jitter control circuit, which reduces conducted EMI noise by giving jitter (frequency diffusion) to the operating frequency for driving a switching element, determines an operating frequency fc (e.g., 40 kHz) at which reduction effects change from a feedback voltage that represents magnitude of a load. The jitter control circuit causes a, for example, 8-bit counter that generates a modulation frequency to operate with, for example, 8 bits when 40 kHz≤fc and 7 bits when fc<40 kHz. In this way, even when the range of the EMI noise measurement frequency is extended to the lower frequency side, for example, to 25 kHz, the maximum reduction effect is maintained in the entire frequency range. Thus, the maximum EMI noise reduction effect is obtained.

18 Claims, 28 Drawing Sheets

(56) References Cited

U.S. PATENT DOCUMENTS

| | | | |
|---|---|---|---|
| 2013/0279203 A1* | 10/2013 | Nishijima | H02M 3/335 363/20 |
| 2013/0320955 A1* | 12/2013 | Kratyuk | H03L 1/022 323/313 |
| 2014/0119062 A1* | 5/2014 | Nishijima | H02M 3/335 363/21.02 |
| 2014/0185340 A1* | 7/2014 | Maruyama | H02M 1/32 363/49 |

* cited by examiner

SWITCHING POWER SUPPLY CONTROL CIRCUIT AND SWITCHING POWER SUPPLY

CROSS-REFERENCE TO RELATED APPLICATION

This application is based upon and claims the benefit of priority of the prior Japanese Patent Application No. 2015-151798, filed on Jul. 31, 2015, the entire contents of which are incorporated herein by reference.

BACKGROUND OF THE INVENTION

1. Field of the Invention

The embodiments discussed herein relate to a switching power supply control circuit and a switching power supply and particularly to a switching power supply control circuit and a switching power supply that optimize a noise reduction effect by giving jitter (frequency diffusion) to a switching frequency.

2. Background of the Related Art

Switching power supplies convert a commercial alternating-current (AC) voltage into any direct-current (DC) voltage and output the converted DC voltage. Switching power supplies need a small number of components and are applicable to a wide input voltage range. For example, flyback switching power supplies in which the output voltage is insulated from a commercial power supply are known.

FIG. 22 is a circuit diagram illustrating an example of a typical configuration of a flyback switching power supply 100.

As illustrated in FIG. 22, this flyback switching power supply 100 includes a control integrated circuit (IC) 8, which is a control circuit for controlling pulse width modulation (PWM), a transformer T, a diode 19, a capacitor 20, and a switching element. In FIG. 22, a metal-oxide-semiconductor field-effect transistor (MOSFET) 17 is used as the switching element.

A commercial AC power supply 1 is supplied to a diode bridge 4 via a common mode choke coil 2 and an X capacitor 3 forming an input noise filter, and the diode bridge 4 performs full-wave rectification on the AC power supply 1.

A capacitor 5 is arranged between the diode bridge 4 and the ground. The capacitor 5 holds an input voltage so that energy is stably supplied to the output side. In addition, the capacitor 5 absorbs the switching noise that occurs when the MOSFET 17 performs its switching operation. In addition, a diode 6 performs a half-wave rectification on the AC power supply 1 and supplies the AC power supply 1 to a VH terminal of the control IC 8 via a current-limiting resistor 7. In this way, the power supply voltage of the control IC 8 at the time of startup is ensured. This current-limiting resistor 7 limits the input current supplied to the VH terminal.

The control IC 8 includes a LAT terminal connected to a thermistor 9 that provides overheat latch protection for the control IC 8. In addition, the control IC 8 includes a CS terminal to which a voltage across a sense resistor 12 is applied via a capacitor 10 and a resistor 11 forming a noise filter.

In addition, the control IC 8 includes a VCC terminal connected to one end of a capacitor 13 and to an auxiliary winding 15 of the transformer T via a diode 14. The capacitor 13 holds the power supply voltage that is supplied to the control IC 8 when a PWM control operation is performed. The diode 14 supplies a voltage to the VCC terminal from the auxiliary winding 15 after startup.

The transformer T includes a primary winding 16, one end of which is connected to the capacitor 5 and the other end of which is connected to the drain terminal of the MOSFET 17. The source terminal of the MOSFET 17 is connected to the ground via the sense resistor 12, and this sense resistor 12 detects a drain current Ids that flows through the MOSFET 17. Namely, the sense resistor 12 converts the on-current of the MOSFET 17 into a voltage signal that is proportional to the magnitude of the on-current, and this voltage signal (current detection signal) is inputted to the CS terminal of the control IC 8 via the noise filter.

The transformer T includes a secondary winding 18 connected to one end of the diode 19 and to the ground via the capacitor 20. The voltage across the capacitor 20 is the output voltage applied to a load 25, and information about this voltage is transmitted from the secondary side to the primary side by a photocoupler 21. The photocoupler 21 is connected in series with a shunt regulator 22, which is connected to the connection point of resistors 23 and 24 that divide the output voltage. This shunt regulator 22 compares a value obtained by dividing the output voltage with an internal reference voltage. In addition, the shunt regulator 22 converts information about the error between the secondary-side output voltage and the reference voltage into a current signal. When this current signal flows through a light emitting diode (LED) included in the photocoupler 21, the current signal is converted into a light signal, which is transmitted to a phototransistor included in the photocoupler 21. In this way, information about the secondary-side output voltage, namely, load information, is transmitted to the primary side.

The switching power supply 100 including the control IC 8 for controlling PWM controls the switching operation of the MOSFET 17 and causes the transformer T to convert the voltage obtained by rectifying the AC input voltage into a predetermined DC voltage.

The control IC 8 configured by an IC circuit includes an FB terminal, and the load information outputted to the load 25 arranged on the secondary side of the transformer T is fed back to and detected by the FB terminal via the shunt regulator 22 and the photocoupler 21 as described above.

In addition, the drain current Ids of the MOSFET 17 is converted by the sense resistor 12 into a voltage, and this voltage is detected by the CS terminal of the control IC 8. The control IC 8 determines an output signal from its OUT terminal by directly or indirectly comparing the voltages at the respective FB and CS terminals. By varying the on-width of the MOSFET 17 based on this output signal, PWM control on the switching power supply is performed. In this way, the power supplied to the load 25 on the secondary side is adjusted.

FIG. 23 is a block diagram illustrating an example of a circuit configuration of the control IC 8.

In the control IC 8, a start-up circuit 31 supplies a current from the VH terminal to the VCC terminal at the time of startup. When the AC power supply 1 is applied, a current flows from the VH terminal to the VCC terminal via the start-up circuit 31 in the control IC 8. As a result, the external capacitor 13 connected to the VCC terminal is charged, and the voltage value of the capacitor 13 is increased.

An under voltage lock out (UVLO) circuit 32 is connected to the VCC terminal and a reference power supply V1. When the voltage value at the VCC terminal (VCC voltage) reaches the reference power supply V1 or more, this UVLO circuit 32 outputs a low (L) level UVLO signal, and an internal power supply circuit 33 is started. Consequently, power is supplied to various circuits in the control IC 8. In contrast, when the VCC voltage is low, the UVLO circuit 32 outputs a high (H) level UVLO signal to stop the operation of the control IC 8.

An oscillator (OSC) 34 is connected to the FB terminal and includes a frequency modulation function, with which the oscillator 34 performs frequency diffusion to reduce the electromagnetic interference (EMI) noise that occurs when the MOSFET 17 performs its switching operation. This oscillator 34 determines the operating frequency of the MOSFET 17 of the control IC 8, includes, in addition to the above frequency modulation function, a frequency varying function to decrease the oscillation frequency when the load is light, and outputs an oscillation signal (maximum duty signal) Dmax.

This oscillation signal Dmax is a signal that is brought in an H level for a long time and in an L level only for a short time per cycle. The cycle of the oscillation signal Dmax is a switching cycle of the switching power supply. The ratio between the period of the cycle and the H-level time thereof represents the maximum duty of the switching power supply. In addition, a slope compensation circuit 35 is connected to the CS terminal and includes a function of preventing subharmonic oscillation, which will be described below.

A FB comparator 36 has input terminals connected to the FB terminal and a reference power supply V2. When the voltage at the FB terminal (FB voltage) falls below the reference power supply V2, the FB comparator 36 determines that the load power is small, outputs a clear signal CLR to a downstream one-shot circuit 37, and stops the switching operation. In contrast, when the FB voltage exceeds the reference power supply V2, the FB comparator 36 starts the switching operation. In this way, the FB comparator 36 realizes a burst operation in which the switching operation is temporarily stopped when the load is light.

When the oscillation signal Dmax outputted from the oscillator 34 rises, the one-shot circuit 37 generates and outputs a set pulse to a downstream RS flip flop 38. This set pulse also serves as a blanking signal that prevents the MOSFET 17 from being erroneously turned off by the noise that occurs at the CS terminal when the MOSFET 17 turns on. The one-shot circuit 37 does not output the set pulse to the RS flip flop 38 while receiving an H-level clear signal CLR.

The RS flip flop 38 generates a PWM signal, along with an OR gate 39 and an AND gate 40. Namely, the OR gate 39 uses the output signal from the one-shot circuit 37 and the output signal from the RS flip flop 38 and generates an OR signal of the two output signals.

While the output signal from this OR gate 39 is basically used as the PWM signal, the AND gate 40 determines the maximum duty of the PWM signal on the basis of the oscillation signal Dmax from the oscillator 34.

The UVLO signal outputted from the UVLO circuit 32 is supplied to a drive circuit (OUTPUT) 42 via an OR gate 41 and controls whether to allow the drive circuit 42 to operate. The drive circuit 42 outputs a switch signal Sout via the OUT terminal, to control the switching of the MOSFET 17. Namely, when the VCC voltage is low and the UVLO circuit 32 outputs a high-level UVLO signal, the output from the drive circuit 42 is turned off (the drive circuit 42 outputs a signal that turns off the MOSFET 17). In contrast, when the VCC voltage is high, the UVLO circuit 32 outputs a low-level UVLO signal, and a latch circuit 49 outputs a low-level output signal, the drive circuit 42 controls the switching of the MOSFET 17 in accordance with the output signal from the AND gate 40.

A level shift circuit 43 has a function of shifting the level of the FB voltage so that the voltage falls within the input voltage range of a CS comparator 44. The shifted output signal from the level shift circuit 43 is supplied to the inverting input terminal (−) of the CS comparator 44. The non-inverting input terminal (+) of the CS comparator 44 is supplied with an output signal from the slope compensation circuit 35. An internal power supply voltage is supplied to the FB terminal via a resistor R0, which serves as a load resistor (pull-up resistor) of the phototransistor included in the photocoupler 21. In this way, the voltage from the internal power supply circuit 33 drops at the resistor R0, and the magnitude of an error signal, which represents amplification of the difference between the voltage applied to the load 25 connected to the switching power supply 100 and the reference voltage, is detected. A larger error signal (a larger voltage at the FB terminal) indicates heavier load.

The CS comparator 44 compares the voltage at the CS terminal (CS voltage) on which slope compensation has been performed to prevent subharmonic oscillation with the FB voltage whose level has been shifted and determines when the MOSFET 17 turns off.

In addition, an OCP comparator 45 is connected to the CS terminal of the control IC 8. The OCP comparator 45 determines the overcurrent detection level of the MOSFET 17. The OCP comparator 45 has a non-inverting input terminal (+) connected to the CS terminal and an inverting input terminal (−) connected to a reference power supply V3.

An off-signal from the CS comparator 44 is supplied to a reset terminal of the RS flip flop 38 via an OR gate 46. In addition, after a delay time control circuit 50 adjusts delay time, an off-signal from the OCP comparator 45 is supplied to the reset terminal of the RS flip flop 38 via the OR gate 46.

A current is supplied from a current source 47 to the thermistor 9 via the LAT terminal. A LAT comparator 48 is connected to the LAT terminal and a reference power supply V4. When the LAT comparator 48 detects that the voltage at the LAT terminal (namely, the voltage across the thermistor 9) reaches the reference power supply V4 or lower, the LAT comparator 48 determines that the control IC 8 is overheated and outputs a set signal to the latch circuit 49.

When receiving the set signal from the LAT comparator 48, the latch circuit 49 outputs an H-level latch signal Latch to the OR gate 41 and an OR gate 51. As a result, the drive circuit 42 is turned off, and the start-up circuit 31 is turned on. In addition, the latch circuit 49 has a reset terminal provided with the UVLO signal from the UVLO circuit 32. When the potential at the VCC terminal is decreased, the latch state is canceled.

When the internal power supply circuit 33 is started and power is supplied to internal circuits, a voltage is applied to the phototransistor included in the photocoupler 21 via the resistor R0 and the FB terminal, and the FB voltage is increased.

When the voltage signal at the FB terminal reaches a fixed voltage value or more, the oscillation signal Dmax is outputted from the oscillator 34. When the oscillation signal Dmax rises, the one-shot circuit 37 outputs a set pulse to the RS flip flop 38.

This set pulse and the output signal from the RS flip flop 38 are inputted to the OR gate 39. Next, the OR gate 39 outputs a PWM signal to the AND gate 40 and the drive circuit 42, and the drive circuit 42 outputs the switch signal Sout to the gate terminal of the MOSFET 17 via the OUT terminal, to drive the MOSFET 17.

In this way, the MOSFET 17 is turned on at a rising edge of the oscillation signal Dmax. As described above, the OR gate 39 generates an OR signal of the output signal from the RS flip flop 38 and the set pulse from the one-shot circuit 37. This is to prevent the RS flip flop 38 from being reset by the noise that occurs at the CS terminal when the MOSFET 17 is turned on and the MOSFET 17 from being turned off immediately after being turned on.

When the MOSFET 17 turns on, since the drain current Ids flows through the sense resistor 12, the voltage at the CS terminal of the control IC 8 increases. Next, the slope compensation circuit 35 of the control IC 8 performs slope compensation on the CS voltage. When this voltage reaches the level of the FB voltage shifted by the level shift circuit 43, the CS comparator 44 outputs a reset signal to the RS flip flop 38 via the OR gate 46.

When the RS flip flop 38 is reset, the OR gate 39 outputs an L-level signal (in a normal operation, the set pulse from the one-shot circuit 37 represents an L level at this point). Consequently, the AND gate 40 outputs an L-level signal, and the MOSFET 17 is turned off by the switch signal Sout.

In addition, even when the load 25 connected to the switching power supply is very heavy and the voltage value fed back to the FB terminal of the control IC 8 falls out of the control range (on the high voltage side), the MOSFET 17 is turned off. Namely, when the OCP comparator 45 compares the CS voltage with the reference power supply V3, if the CS voltage is equal to or more than the reference power supply V3, the MOSFET 17 is turned off.

Before the CS comparator 44 compares the FB voltage whose level has been shifted with the CS voltage, the slope compensation circuit 35 performs slope compensation on the CS voltage. In this slope compensation, the slope compensation circuit 35 adds a slope compensation voltage proportional to the on-width of the MOSFET 17.

Generally, as long as the MOSFET 17 operates in a steady state, a current having a constant magnitude flows through the MOSFET 17 at the beginning of each switching cycle. However, when the duty (duty cycle=on-width/switching cycle) of the MOSFET 17 is excessively increased, the magnitude of the current does not remain constant. Namely, per switching cycle, the state of the current flowing through the MOSFET 17 fluctuates. If this occurs, the current flowing through the MOSFET 17 behaves as a signal in which a low frequency signal is superimposed on the switching frequency signal.

Such an oscillation at a low frequency is known as subharmonic oscillation, which is caused under a certain condition. Occurrence of the subharmonic oscillation can be prevented by preventing this condition from being met, more specifically, by performing slope compensation in which a monotonically increasing signal is superimposed on the CS voltage.

In the switching power supply 100, the oscillator 34 of the control IC 8 generates the oscillation signal Dmax for causing the MOSFET 17 to perform its switching operation. Typically, a frequency between 65 kHz and 25 kHz is used. Namely, the switching frequency is fixed at 65 kHz when the load 25 is heavy, and the switching frequency is changed from 65 kHz to 25 kHz as the load 25 becomes lighter. When the switching frequency is decreased down to 25 kHz, the switching frequency is fixed at 25 kHz. Namely, the switching frequency is prevented from decreasing to the audible frequency at which the transformer T causes noise. In this way, since the operating frequency is decreased as the load becomes lighter, the efficiency of the switching power supply 100 is improved.

For example, when the switching frequency is fixed at 65 kHz, high-order harmonics having a fundamental wave of 65 kHz are simultaneously generated, and these high-order harmonics are released to the outside of the switching power supply 100 as radiated EMI and conducted EMI. Since such EMI noise negatively affects operations of other electronic devices, a limit that prohibits more than a certain amount of EMI noise is defined. Hereinafter, conducted EMI noise that is transmitted through cables or substrate wirings will be described.

In the field of power electronics including the switching power supply 100, jitter (frequency diffusion) is used to reduce conducted EMI noise (for example, see International Publication No. 2006/019196, Japanese Laid-open Patent Publication No. 2003-150660, and YAMADA Tomonori, IMAZATO Masaharu, and YOSHINAGA Takashi, "Estimation of the EMI Reduction by Spread Spectrum Clock," The Institute of Electronics, Information and Communication Engineers (IEICE) Technical Report, Engineering Sciences Society IEICE, Dec. 21, 2001, vol. 101, no. 530, pp. 37-42 (hereinafter, YAMADA).

FIG. 24 illustrates the difference in noise energy between when jitter is used and when jitter is not used, and FIG. 25 illustrates a modulation frequency. In FIG. 24, the horizontal axis represents the switching frequency, and the vertical axis represents the noise energy. The right graph in FIG. 24 illustrates center diffusion in which an operating frequency fc corresponding to when jitter is not used is diffused within ±Δ f/2.

As illustrated on the left graph in FIG. 24, when jitter is not used, the noise energy is significantly high and reaches its peak at the operating frequency fc. In contrast, if the operating frequency fc is diffused within ±Δ f/2, the noise energy is also diffused, and the average value and the peak values of the noise energies are reduced. Namely, even when jitter is not used and the peak of the noise energy is above the limit, if jitter is used, the peaks equal to or less than the limit are obtained. While the frequency diffusion is performed by modulating the operating frequency fc with a modulation frequency fm, the waveform of the modulation frequency fm (hereinafter, the waveform that indicates the time change of the operating frequency fc modulated by the modulation frequency fm or a signal that corresponds to the operating frequency fc) is formed by a multi-bit digital signal. When the output from a counter is directly applied as the multi-bit digital signal, the waveform of the modulation frequency fm changes in a stepwise manner.

FIG. 26 illustrates a noise level reduction effect obtained when the switching frequency is diffused. In FIG. 26, the horizontal axis represents the diffusion width and the vertical axis represents the attenuation amount. More specifically, FIG. 26 illustrates the noise attenuation amount when the operating frequency fc of the fundamental wave is 65 kHz and the resolution bandwidth RBW, which is the measurement frequency width, is 9 kHz.

As illustrated in FIG. 26, a wider diffusion width achieves a larger attenuation amount S, namely, a larger noise level reduction effect.

Since the current standard for conducted EMI defines that the frequency range in which the EMI noise is measured is from 150 kHz to 30 MHz, it is only enough to examine the attenuation effects about harmonics of 150 kHz or more. As illustrated from FIG. 26, 20 kHz or more needs to be ensured as the diffusion width (Δf), to obtain an attenuation amount of 3 dB or more. Hereinafter, two basic switching operations, performed when the operating frequency fc is 65 kHz and 25 kHz, respectively, will be described, assuming that the diffusion width is ±7% of the operating frequency fc. Namely, the switching power supply 100 operates at 65 kHz±4.55 kHz when the load is heavy and operates at 25 kHz±1.75 kHz when the load is light.

When the operating frequency fc is 65 kHz±4.55 kHz, a harmonic of 150 kHz or more does not appear until the order n reaches 3. The frequency of this third harmonic is 3×(65 kHz±4.55 kHz)=195 kHz±13.65 kHz, and the diffusion width is 27.3 kHz. Regarding a harmonic, the higher the order is, the smaller the energy will be. Thus, if the third harmonic falls below the EMI limit, the attenuation amounts of the fourth harmonic and subsequent harmonics do not need to be considered, except phenomena such as ringing in a discontinuous current mode (DCM).

When the operating frequency fc is 25 kHz±1.75 kHz, a harmonic of 150 kHz or more does not appear until the order n reaches 6. The frequency of this sixth harmonic is 6×(25 kHz±1.75 kHz)=150 kHz±10.5 kHz, and the diffusion width is 21 kHz.

Thus, by setting the diffusion width to ±7% with respect to each of the operating frequencies fc (65 kHz and 25 kHz) of the switching operation, the diffusion width of 20 kHz or more is ensured, and an attenuation amount of 3 dB or more is obtained in the frequency range in which the EMI noise is measured.

FIG. 27 is a circuit diagram illustrating a configuration example of an oscillator having a jitter control circuit 70 that performs frequency diffusion. FIG. 28 is a circuit diagram illustrating a configuration example of the jitter control circuit 70.

As illustrated in FIG. 27, the oscillator 34 includes a buffer amplifier 61 that detects a feedback voltage FB and an amplifier 62 that controls the current that flows through a transistor (n-channel MOSFET) N1 on the basis of the output from the buffer amplifier 61. The transistor N1 is connected to a current mirror circuit formed by transistors (p-channel MOSFETs) P1 and P2, and the current that flows through the transistor N1 is a first input current of the current mirror circuit. In addition, a current source is connected between the drain terminal of the transistor P1 and the ground, and the current from the current source is a second input current of the current mirror circuit. The current outputted from the current mirror circuit is supplied to a transistor N2 connected to the drain terminal of the transistor P2, which is an output terminal of the current mirror circuit, and the supplied current is used to control the current that flows through a transistor N5. In addition, the current outputted from the current mirror circuit is used to control the current that flows through a transistor P4 via transistors N3 and P3.

The transistors P4 and N5 are connected in series with each other via transistor P5 and N4 that are complementarily turned on and off. The connection point between the transistors P5 and N4 is connected to a capacitor C. The transistor P5 charges the capacitor C with the current that flows through the transistor P4 when performing an on-operation. The transistor N4 discharges the capacitor C with the current that flows through the transistor N5 when performing an on-operation. The transistors N2, N3, and N5 form a second current mirror circuit, and the transistors P3 and P4 form a third current mirror circuit.

A hysteresis comparator 63 compares the charging or discharging voltage of the capacitor C with a predetermined reference voltage Vref. The inverter 64 inverts the output from the hysteresis comparator 63 and generates the oscillation signal Dmax for turning on or off the MOSFET 17. Since the hysteresis comparator 63 has hysteresis characteristics, the reference voltage Vref compared with the charging or discharging voltage of the capacitor C is formed by two reference voltages of a high-side reference voltage VrefH and a low-side reference voltage VrefL in practice. In addition, simultaneously, the output from the hysteresis comparator 63 is used as a control signal for complementarily turning on and off the transistors P5 and N4 and as a clock signal that defines the operation of the jitter control circuit 70.

As illustrated in FIG. 28, the jitter control circuit 70 includes a plurality of (four) transistors P11 to P14 that forms a current mirror circuit with the transistor P1 in parallel to each other. These transistors P11 to P14 are connected in series with transistors P15 to P18, respectively. The transistors P15 to P18 are turned on and off in response to outputs Q0 to Q3 from a frequency divider and counter 71, selectively obtain currents flowing through the respective transistors P11 to P14, and add the selected currents to a drain current that flows through the transistor N2.

For example, the currents that flow through the transistors P11 to P14 are set to I1, I2 (=2·I1), I3 (=2·I2=4·I1), I4 (=2·I3=4·I2=8·I1), respectively. The ratio of these currents is set by changing the gate width/gate length of each of the transistors P11 to P14 that form a current mirror circuit with the transistor P1.

The frequency divider and counter 71 divides the frequency outputted from the hysteresis comparator 63 and performs a counting operation. The frequency divider and counter 71 determines the counted value and sequentially changes the outputs Q0 to Q3 within [0000]-[1111], for example. In this way, the transistors P15 to P18 are selectively turned on and off. Accordingly, the currents that flow through the respective transistors P11 to P14 are selectively outputted.

As a result, an output current b from the jitter control circuit 70 changes in a stepwise manner. In FIG. 28, since the output from the frequency divider and counter 71 is represented by 4 bits, the output current b changes in 16 levels and is added to the transistor N2. Next, the current with which the capacitor C is charged is changed in a stepwise manner, and a periodical change is given to the time needed to charge the capacitor C up to the reference voltage Vref. Consequently, the frequency of the pulse signal outputted via the hysteresis comparator 63 is provided with periodical jitter having a certain width. This control on the oscillation frequency is jitter control on the switching frequency for driving the MOSFET 17. By performing this jitter control, the frequency of the EMI noise that occurs when the MOSFET 17 performs switching is diffused, and the EMI noise is accordingly reduced.

According to the current standard for the conducted EMI, the measurement frequency range is over 150 kHz. However, in order to prevent conducted EMI noise from occurring in a lower frequency range, extending the measurement frequency range in which the EMI noise is measured to a frequency less than 150 kHz is under consideration. If the measurement frequency range is extended, the operating frequency of the switching operation, namely, the frequency of the fundamental wave (for example, 65 kHz) having the largest noise energy falls within the measurement frequency range, and measures against the noise need to be taken for the fundamental wave of the switching frequency. An EMI filter may be used to suppress this noise. However, since the frequency is low, constants of an inductor and a capacitor are increased. Accordingly, since the sizes of components are also increased, the size of the switching power supply is increased. As a result, the cost could be increased.

SUMMARY OF THE INVENTION

According to one aspect, there is provided a switching power supply control circuit that causes a switching element connected to an input voltage source to perform switching to generate and output a predetermined direct-current voltage to a load and that reduces an operating frequency of the switching as magnitude of the load decreases, the control circuit including: an oscillator that determines the operating frequency by charging a capacitor with a predetermined current based on the magnitude of the load or discharging the capacitor; and a jitter control circuit that is included in the oscillator and that performs frequency diffusion by modulating the operating frequency with a modulation frequency based on a changeable bit number of a counter, wherein the jitter control circuit switches the bit number of the counter at the operating frequency corresponding to a point of intersection of calculated curves each of which indicates a conducted electromagnetic interference reduction effect with respect to the operating frequency for each bit number.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 22:
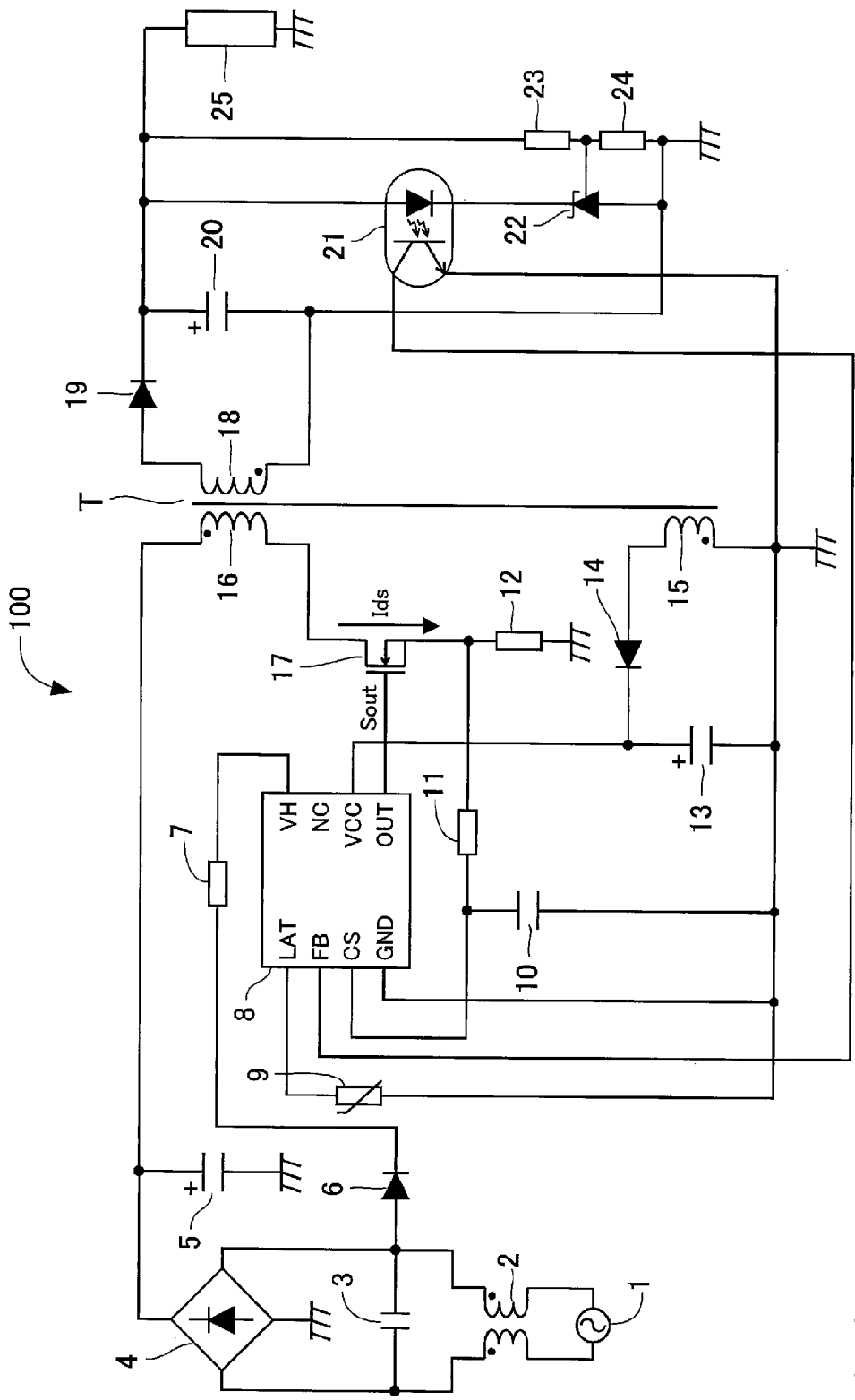
FIG. 22 is a circuit diagram illustrating an example of a typical configuration of a flyback switching power supply.
Figure 23:
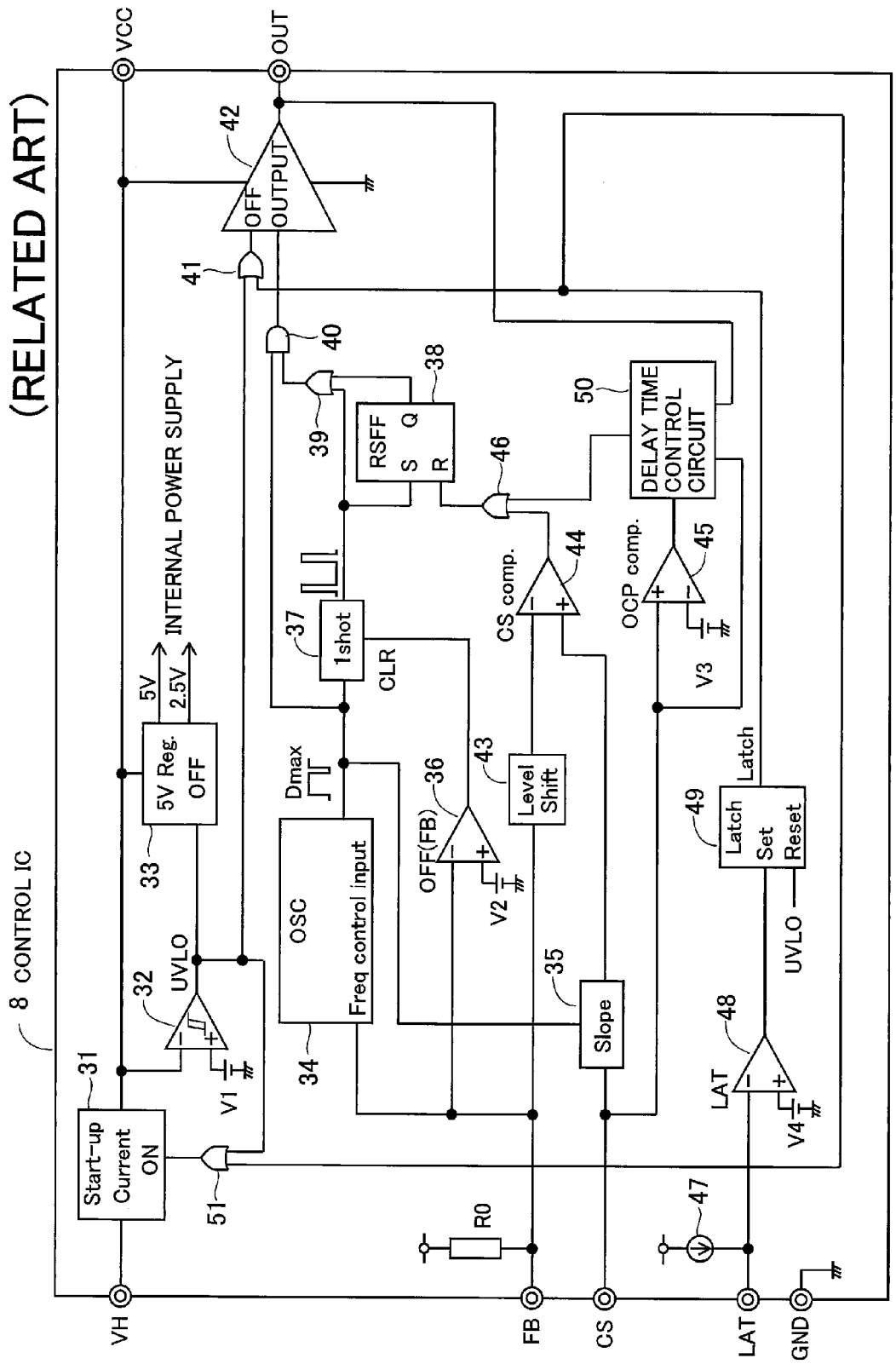
FIG. 23 is a block diagram illustrating an example of a circuit configuration of a control IC.
Figure 24:
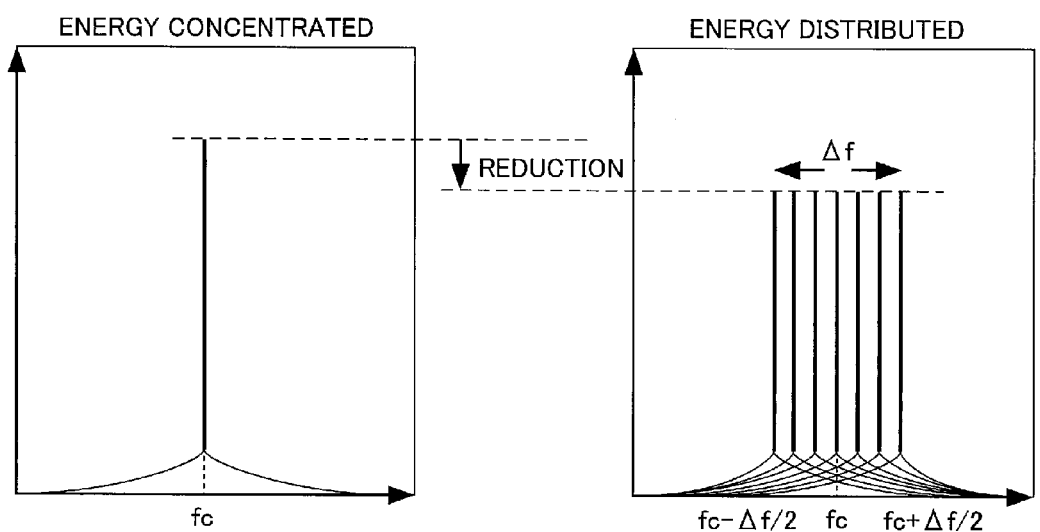
FIG. 24 illustrates the difference in noise energy between when jitter is used and when jitter is not used.
Figure 25:
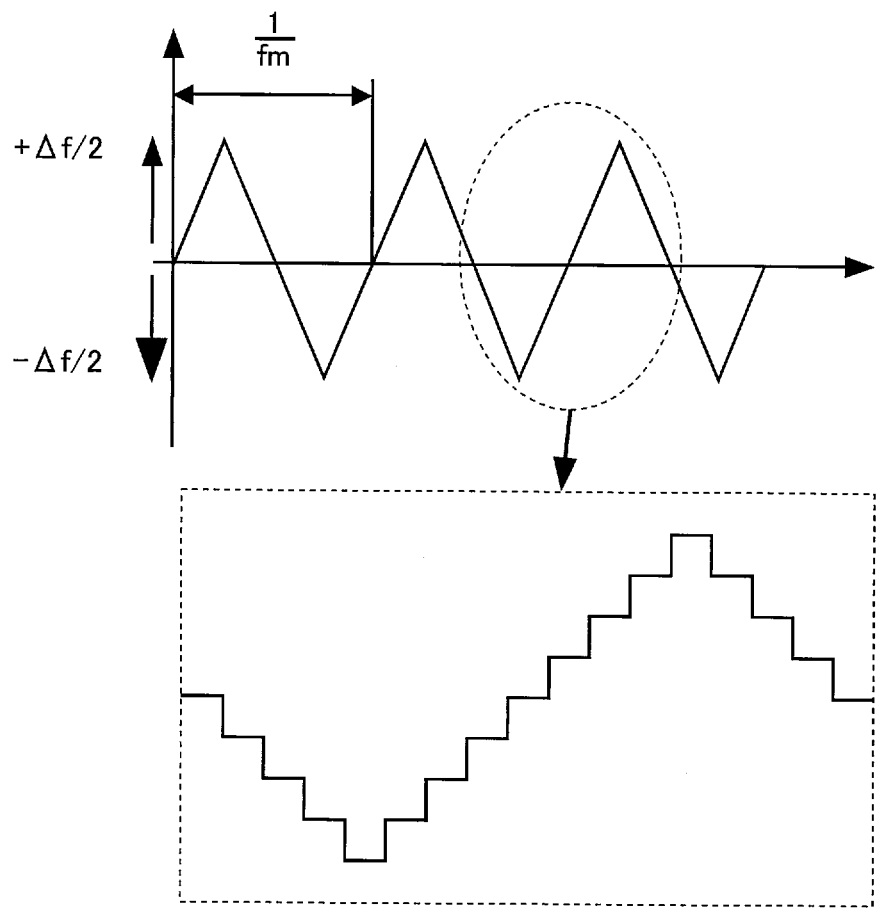
FIG. 25 illustrates a modulation frequency.
Figure 26:
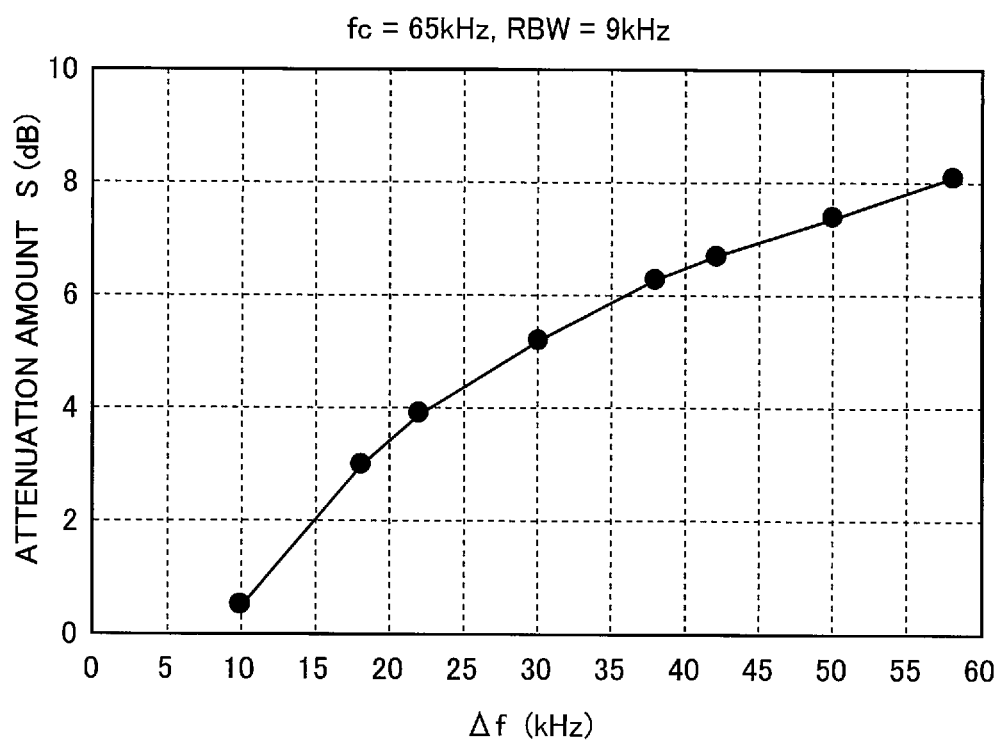
FIG. 26 illustrates a noise level reduction effect obtained when the switching frequency is diffused.
Figure 27:
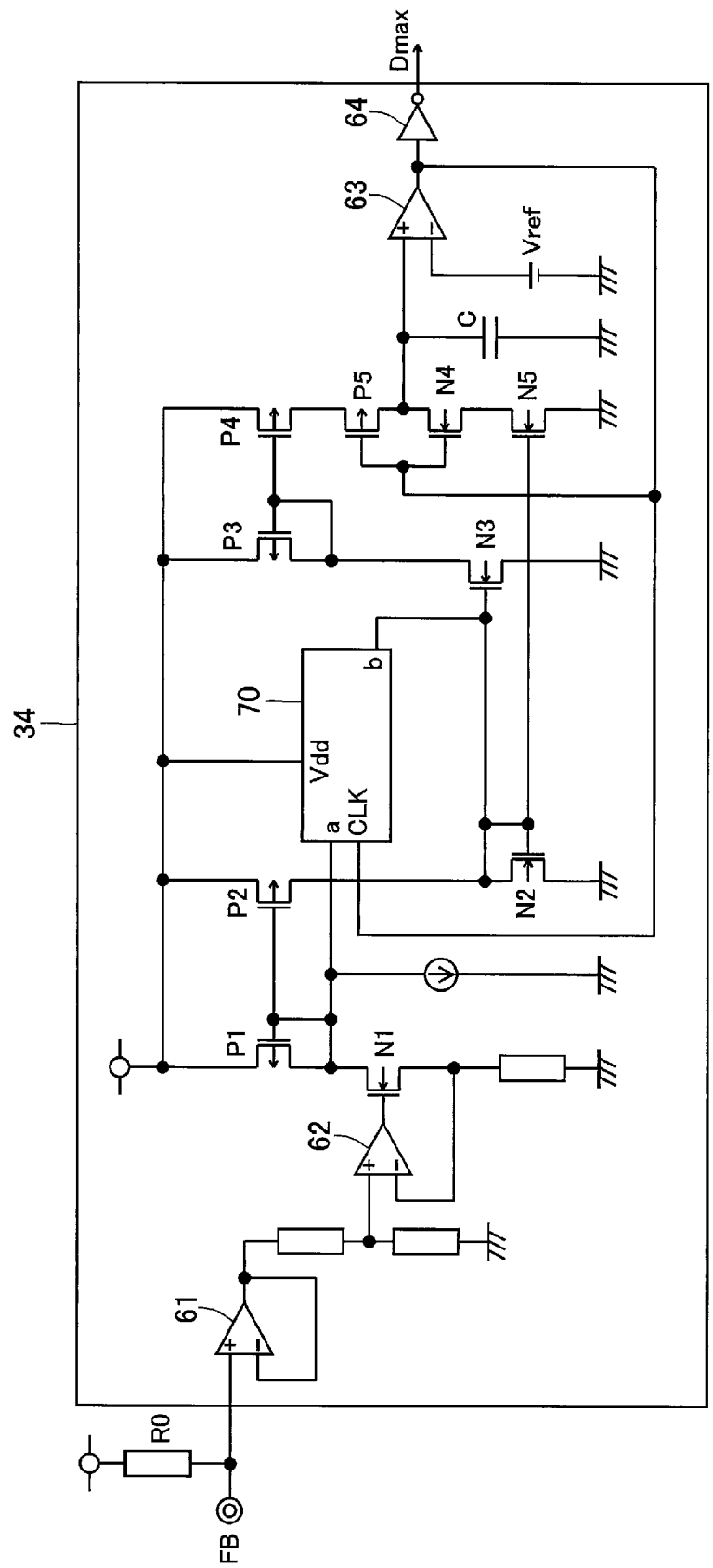
FIG. 27 is a circuit diagram illustrating a configuration example of an oscillator having a jitter control circuit that performs frequency diffusion.
Figure 28:
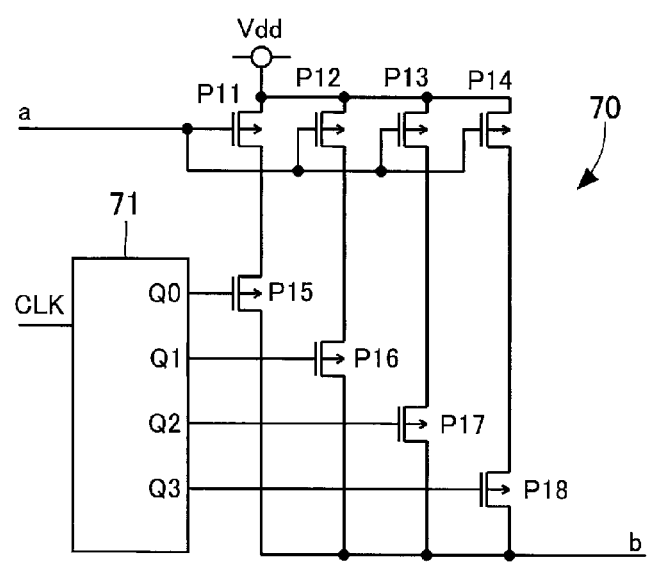
FIG. 28 is a circuit diagram illustrating a configuration example of the jitter control circuit.

Hereinafter, several embodiments will be described below in detail with reference to the accompanying drawings, wherein like reference characters refer to like elements throughout. In the following description, an overall configuration of an individual switching power supply is the same as that illustrated in the above FIG. 22. In addition, an overall circuit configuration of an individual control IC is the same as that illustrated in the above FIG. 23. Thus, the following description refers to FIGS. 22 and 23 as needed, and like elements will be denoted by like reference characters. In addition, in the following description, as needed, the same reference characters will be used for the names of some terminals and the voltages and signals at the terminals, for example.

The present technique has been developed in response to the discussion of extending the measurement frequency range according to the conducted EMI standard from 150 kHz-30 MHz to 9 kHz-30 MHz. The present technique achieves the maximum effect in reducing the conducted EMI even when the measurement frequency range is extended to 150 kHz or lower. First, a concept of the present technique will be described.

Figure 1:
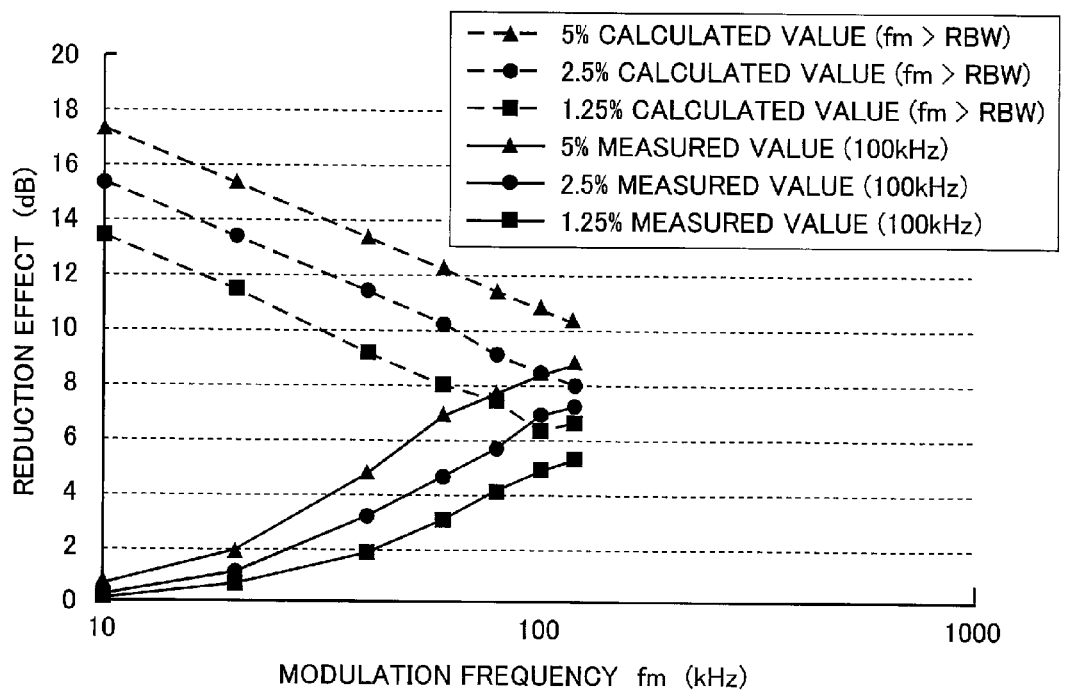
FIG. 1 illustrates calculated values and measured values that represent EMI reduction effects.
Figure 2:
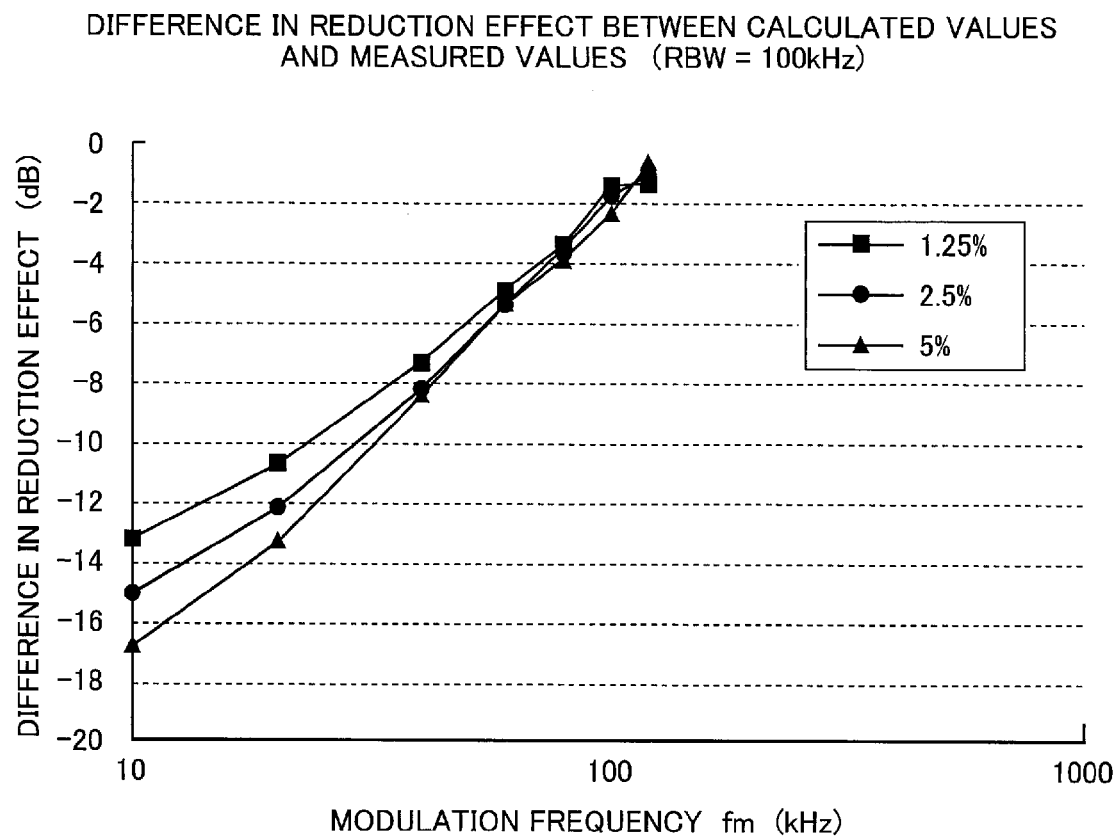
FIG. 2 illustrates the difference in EMI reduction effect between the calculated values and the respective measured values.

FIG. 1 illustrates calculated values and measured values that represent EMI reduction effects. FIG. 2 illustrates the difference in EMI reduction effect between the calculated values and the respective measured values. In FIG. 1, the horizontal axis represents the modulation frequency fm and the vertical axis represents the EMI reduction effect. In FIG. 2, the horizontal axis represents the modulation frequency fm and the vertical axis represents the difference in EMI reduction effect.

FIGS. 1 and 2 are seen in Yamada, which discusses estimation of the EMI reduction by spread spectrum clock, and indicate EMI reduction effects and the difference in EMI reduction effect when the resolution bandwidth RBW is 100 kHz.

As illustrated in FIG. 1, when the modulation frequency fm is larger than the resolution bandwidth RBW (fm>RBW), the lower the modulation frequency fm is, the larger the reduction effect will be, as indicated by the dashed line curves. The values on these dashed-line curves can be obtained by calculation using a theoretical formula (Bessel function) for frequency modulation. While the calculated values representing their respective reduction effects have not been obtained by taking the resolution bandwidth RBW of the measuring instrument into consideration, when fm<resolution bandwidth RBW=100 kHz, as the modulation frequency fm becomes lower, the impact of the resolution bandwidth RBW is gradually increased. Namely, the measured values are decreased as indicated by the solid-line curves. The reduction effects in this case are decreased as the modulation frequency fm becomes lower.

The graph in FIG. 2 illustrates the difference in EMI reduction effect between the calculated values and the respective measured values in FIG. 1. This graph represents a correction amount made to each calculated value when the measurement is made under the condition that the resolution bandwidth RBW is 100 kHz.

International Publication No. 2006/019196 and Japanese Laid-open Patent Publication No. 2003-150660 also discuss the EMI Reduction effect as discussed by Yamada. According to these related techniques, the difference (correction) between the calculated values obtained by using the theoretical formula (Bessel function) for frequency modulation and experimental values is used. When a new design is made and a reduction effect is estimated, the effectiveness is quantified by using the difference (correction). While this EMI reduction effect is directed to radiated EMI over 30 MHz, it is also applicable to conducted EMI at 150 kHz or less.

Next, reduction of the conducted EMI at 150 kHz or less will be described. It is determined that the resolution bandwidth RBW of the measuring instrument is set to 200 Hz at 150 kHz or less. In this case, the optimum modulation frequency fm is 200 Hz. This is because the maximum EMI reduction effect is obtained when the modulation frequency fm is approximately equal to the resolution bandwidth RBW of the measuring instrument (see International Publication No. 2006/019196).

Figure 3:
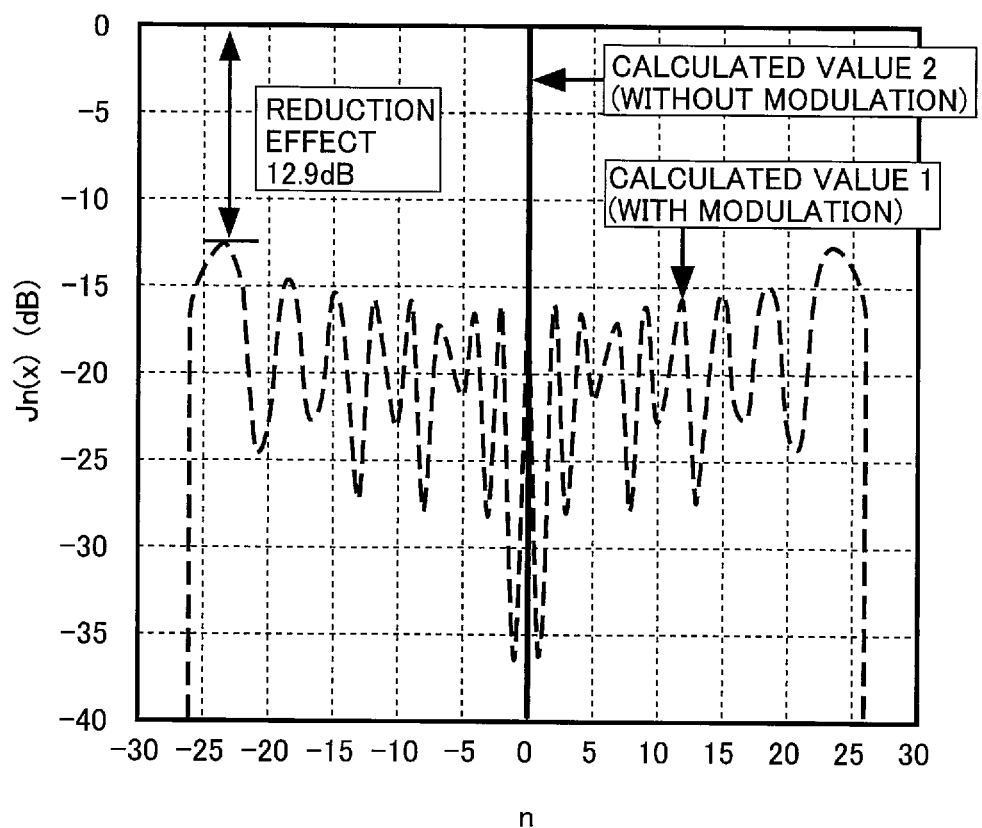
FIG. 3 illustrates a reduction effect represented by using a Bessel function.

FIG. 3 illustrates a reduction effect represented by using a Bessel function. FIG. 3 illustrates spectra obtained before and after modulation performed when the operating frequency fc is 65 kHz, diffusion rate δ is ±8%, the modulation frequency fm is 200 Hz, and a variable of the Bessel function is $x=(\Delta f/2)/fm=0.08 \times 65 k/200=26$.

FIG. 3 illustrates a modulated spectrum (calculated value 1 indicated by a dashed line) calculated by the Bessel function and an unmodulated spectrum (calculated value 2). The modulated spectrum indicates that the frequency band has been extended by the frequency modulation. In contrast, the unmodulated spectrum is the spectrum prior to the application of the spread spectrum clock technique. In addition, the amplitude of this unmodulated spectrum is set to 0 dB as a reference value.

The difference between the maximal value obtained from the modulated spectrum and the amplitude of the unmodulated spectrum will be defined as the reduction effect. In the example in FIG. 3, 12.9 dB is obtained as the reduction effect.

Figure 4:
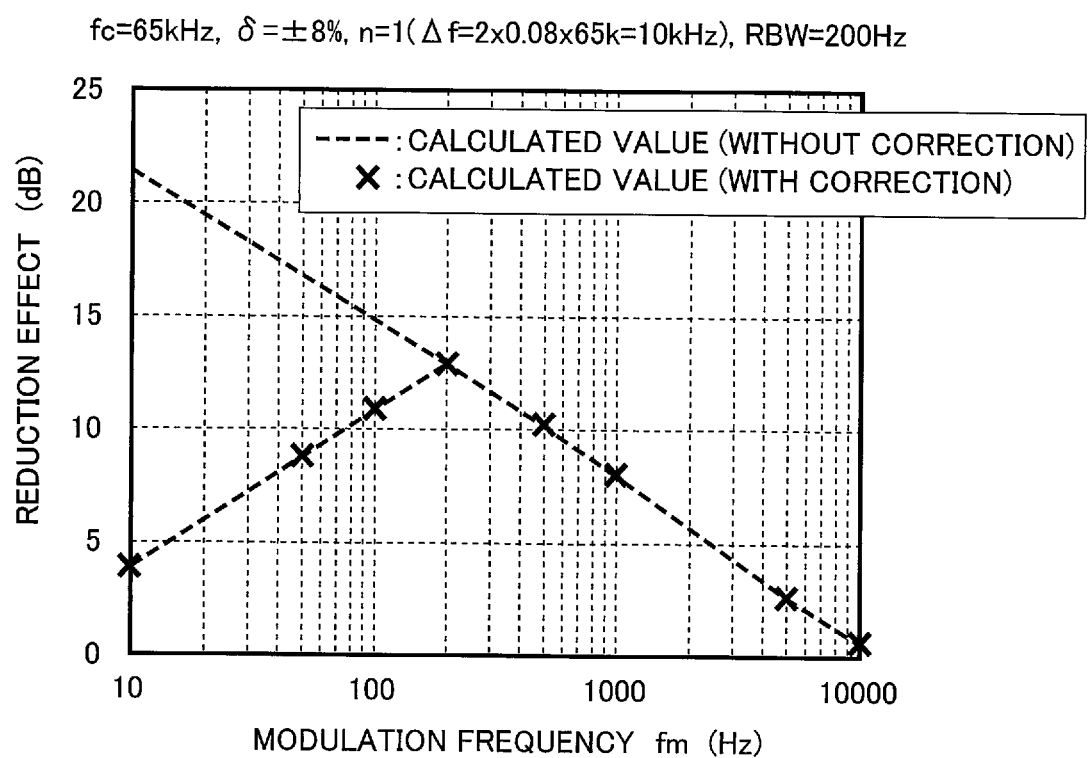
FIG. 4 illustrates a reduction effect calculation example that uses the Bessel function.

FIG. 4 illustrates a reduction effect calculation example using the Bessel function. In this calculation example, in addition to the calculation result obtained by using the Bessel function and the reduction result obtained from International Publication No. 2006/019196 and the definition of the reduction effect illustrated in FIG. 3, a method of correcting the reduction effect in the range in which the modulation frequency fm is equal to the resolution bandwidth RBW or less with the difference between the calculated values and the experimental values is used. More specifically, when fm>RBW (=200 Hz), the calculation result obtained by using the Bessel function and the above definition of the reduction effect are directly applied (no correction in view of RBW is made). In addition, in the range of fm≤RBW in which correction is made, the calculated values obtained when correction is not made are reflected symmetrically about the horizontal line corresponding to 12.9 dB, which is the maximum effect when fm=200 Hz. In this way, the calculated values that have been corrected are obtained. This operation is possible because the calculated values (dashed lines) and the measured values (solid lines) in the region of fm≤RBW in FIG. 1 are approximately symmetric about the horizontal line that indicates the reduction effect when fm=RBW.

Figure 5:
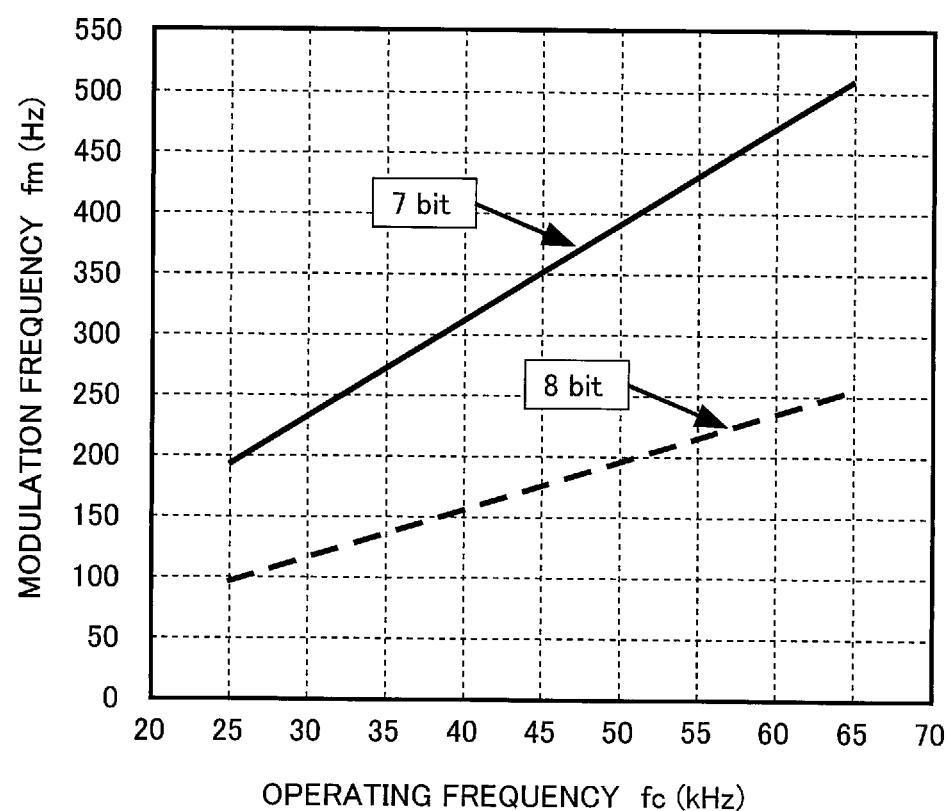
FIG. 5 illustrates change of a modulation frequency when the operating frequency is between 25 kHz and 65 kHz.
Figure 6:
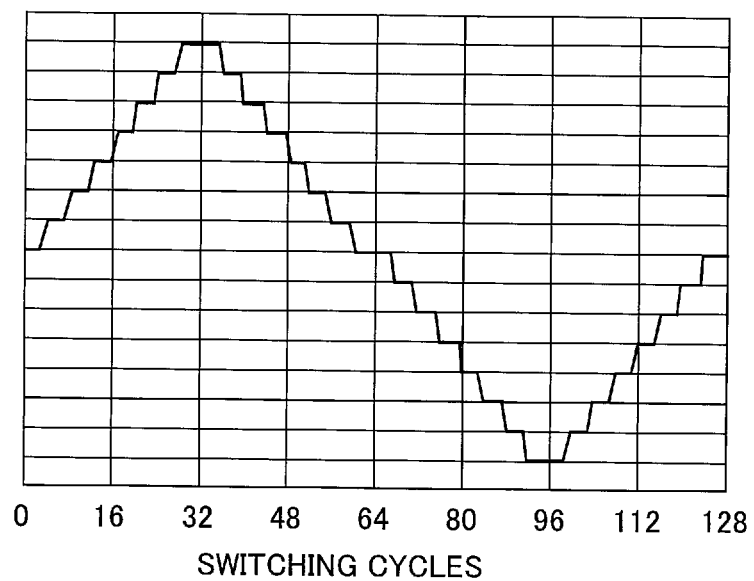
FIG. 6 illustrates an example of the waveform of a modulation frequency.
Figure 7:
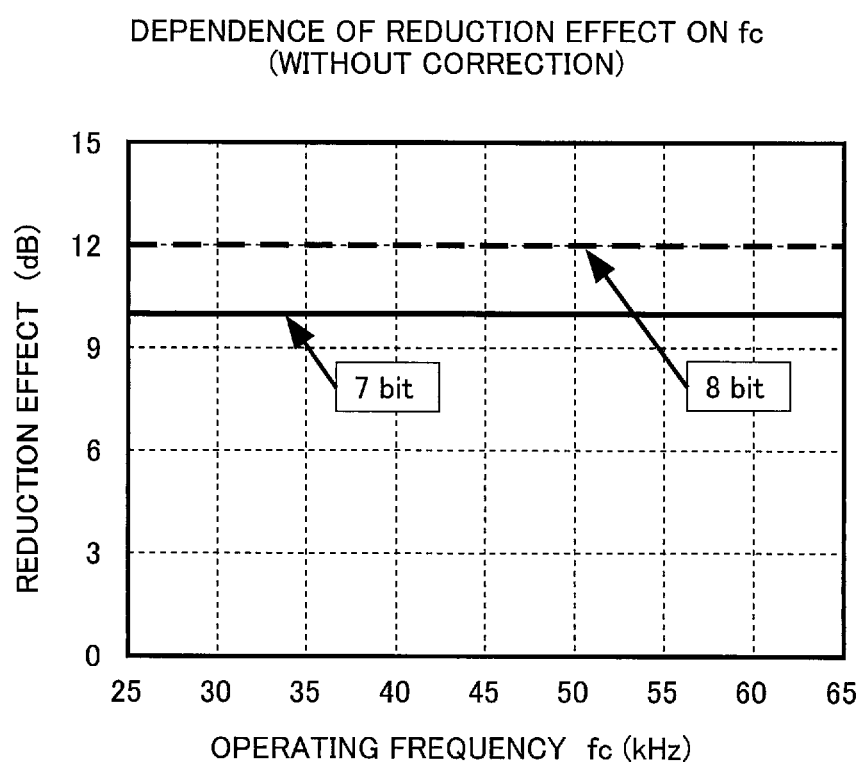
FIG. 7 illustrates dependence of reduction effects on the operating frequency (without correction)
Figure 8:
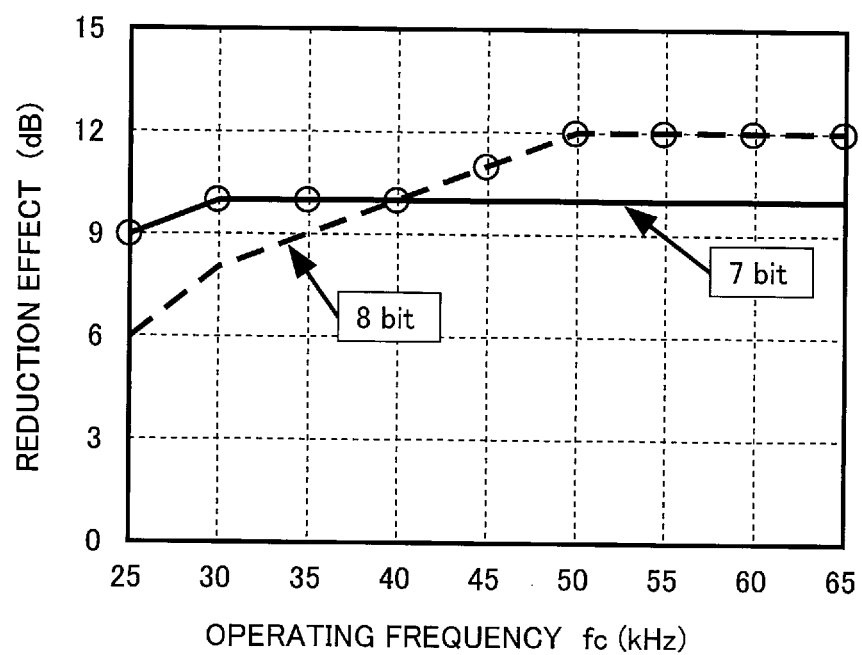
FIG. 8 illustrates dependence of reduction effects on the operating frequency (with correction)
Figure 9:
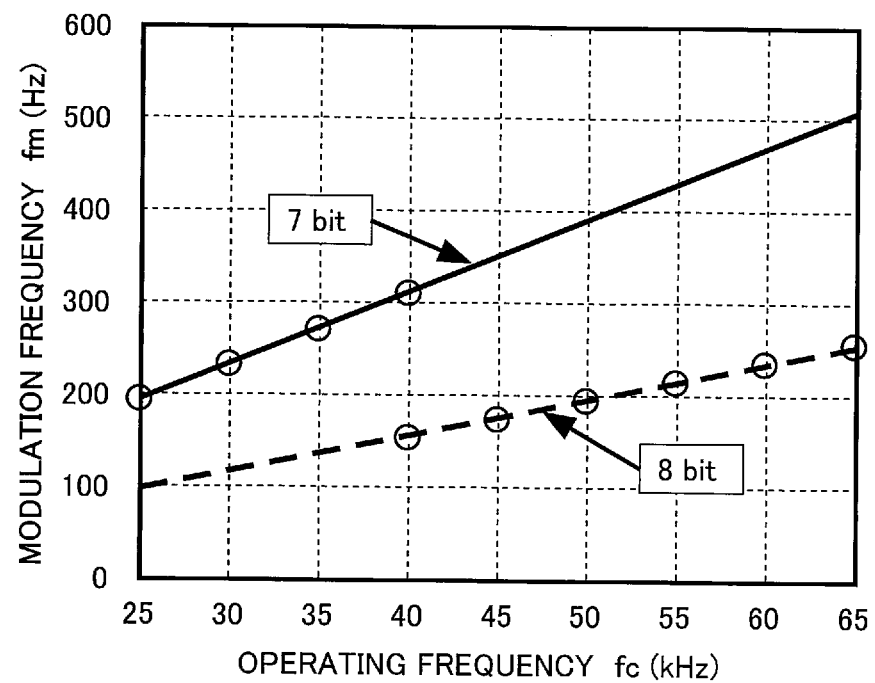
FIG. 9 illustrates dependence of the modulation frequency on the operating frequency.

FIG. 5 illustrates change of the modulation frequency when the operating frequency is between 25 kHz and 65 kHz. FIG. 6 illustrates an example of the waveform of the modulation frequency. FIG. 7 illustrates dependence of reduction effects on the operating frequency (without correction). FIG. 8 illustrates dependence of reduction effects on the operating frequency (with correction). FIG. 9 illustrates dependence of the modulation frequency on the operating frequency.

Since the switching power supply performs switching when the operating frequency fc is between 25 kHz and 65 kHz, the waveform of the modulation frequency fm represents a triangular waveform having a cycle based on the operating frequency fc in the operation range. Since this triangular waveform is generated by a multi-bit counter that counts (inverting signals of) the oscillation signals Dmax, the triangular waveform is formed in a stepwise manner with the number of steps based on the bit number of the counter (see FIG. 6).

For example, when the bit number of the counter is 7, since the number of steps represented by the 7 bits is $2^7=128$, the modulation cycle corresponds to 128 cycles of the oscillation signal Dmax. Thus, the modulation frequency fm is represented by fc/128.

When the operating frequency fc is 65 kHz, fm=65 kHz/128=508 Hz. When the operating frequency fc is 25 kHz, fm=25 kHz/128=195 Hz. Thus, when the operating frequency fc changes between 25 kHz and 65 kHz, the modulation frequency fm changes between 508 Hz and 195 Hz, as illustrated in FIG. 5.

In contrast, when the bit number of the counter is 8, the number of steps represented by 8 bits is $2^8=256$. In this case, when the operating frequency fc is 65 kHz, fm=65 kHz/256=254 Hz. When the operating frequency fc is 25 kHz, fm=25 kHz/256=97 Hz. Thus, when the operating frequency fc changes between 25 kHz and 65 kHz, the modulation frequency fm changes between 254 Hz and 97 Hz.

FIG. 7 illustrates reduction effects with respect to the operating frequency fc. The reduction effects have been calculated by using the modulation frequency fm obtained as described above and a theoretical formula for frequency modulation (the calculation expression using the Bessel function). As illustrated in FIG. 7, it is seen that certain reduction effects, about 10 dB and 12 dB, are obtained with respect to the operating frequency fc in both cases where the bit number is 7 and 8, respectively. However, this graph in FIG. 7 illustrates the reduction results obtained when the impact of the resolution bandwidth RBW is not taken into consideration, namely, when no correction is made (FIG. 7 illustrates the results obtained by using the calculated values (without correction) in FIG. 4). FIG. 8 illustrates the reduction effects when the resolution bandwidth RBW is taken into consideration, namely, when correction is made (FIG. 8 illustrates the results obtained by using the calculated values (with correction) in FIG. 4). Namely, when the counter operates with 7 bits and when the operating frequency fc is 25 kHz, a reduction effect of 9 dB is obtained, and when the operating frequency fc is between 30 kHz and 65 kHz, a reduction effect of 10 dB is steadily obtained. When the counter operates with 8 bits and when the operating frequency fc is between 25 kHz and 50 kHz, a reduction effect from 6 dB to 12 dB is obtained, and when the operating frequency fc is between 50 kHz and 65 kHz, a reduction effect of 12 dB is steadily obtained.

FIG. 8 illustrates that the 7-bit and 8-bit curves intersect when the operating frequency fc is 40 kHz and that the maximum reduction effect is obtained in the entire frequency range if the modulation frequency fm is generated with 7 and 8 bits on the lower and higher frequency sides of this operating frequency, respectively. As illustrated in FIG. 8, when the operating frequency fc is 40 kHz, the bit number is switched. In this way, as indicated by the circles, the maximum reduction effect is always obtained whatever the operating frequency fc is in the range. Namely, the reduction effect is optimized.

By applying the circles in FIG. 8 that represents this optimization to the graph in FIG. 5, FIG. 9 is obtained. Namely, when the switching power supply operates with a heavy load and when the operating frequency fc is 65 kHz, the modulation frequency fm is generated with 8 bits. When the load becomes lighter and the operating frequency fc is decreased to 40 kHz, the bit number for generating the modulation frequency fm is switched from 8 to 7. Namely, when the load is lighter where the operating frequency fc is 40 kHz or less, the modulation frequency fm is generated with 7 bits.

Thus, by causing a multi-bit counter to generate the modulation frequency fm and to switch its bit number when the load (operating frequency fc) reaches a predetermined level, the effect of reducing the conducted EMI noise is optimized in the entire operating frequency range. More specifically, it is only necessary to switch the bit number of the counter that generates the modulation frequency fm between 7 and 8 when the operating frequency fc is 40 kHz. Hereinafter, circuit examples that realize this switching will be described.

First Embodiment

Figure 10:
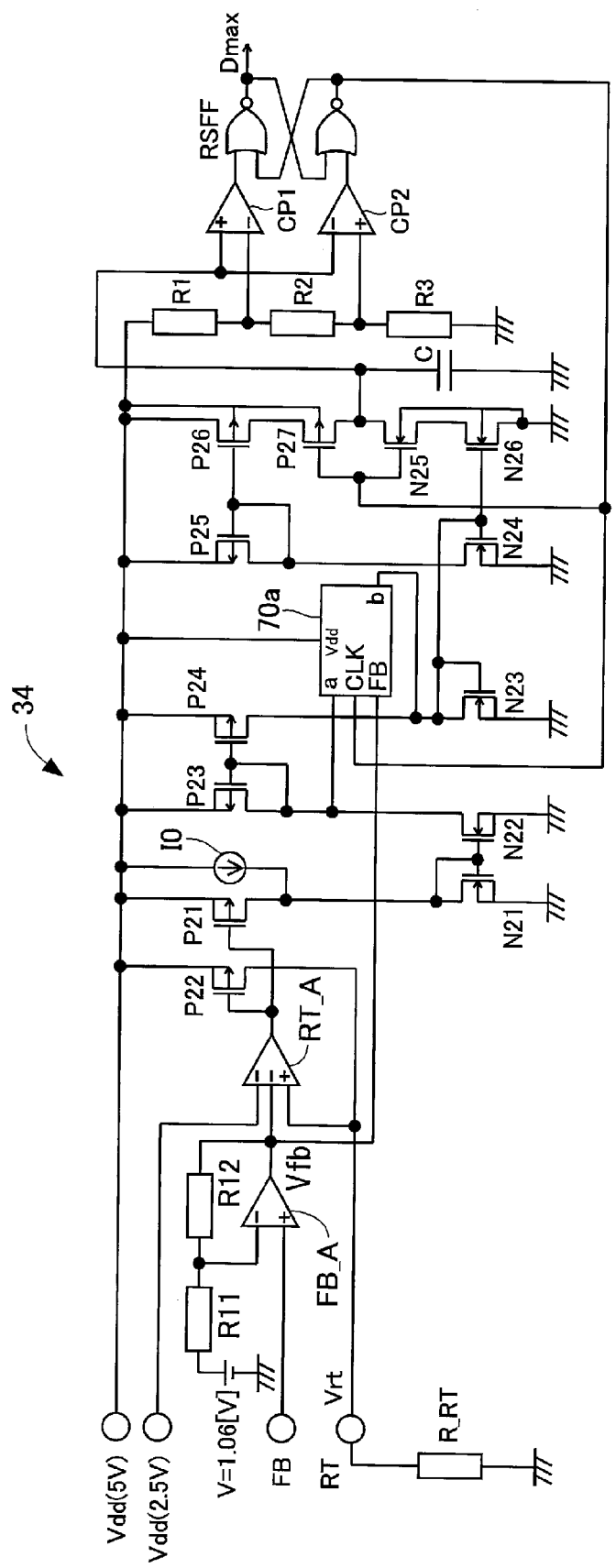
FIG. 10 illustrates a schematic configuration of an oscillator in a control IC in a switching power supply according to a first embodiment.
Figure 11:
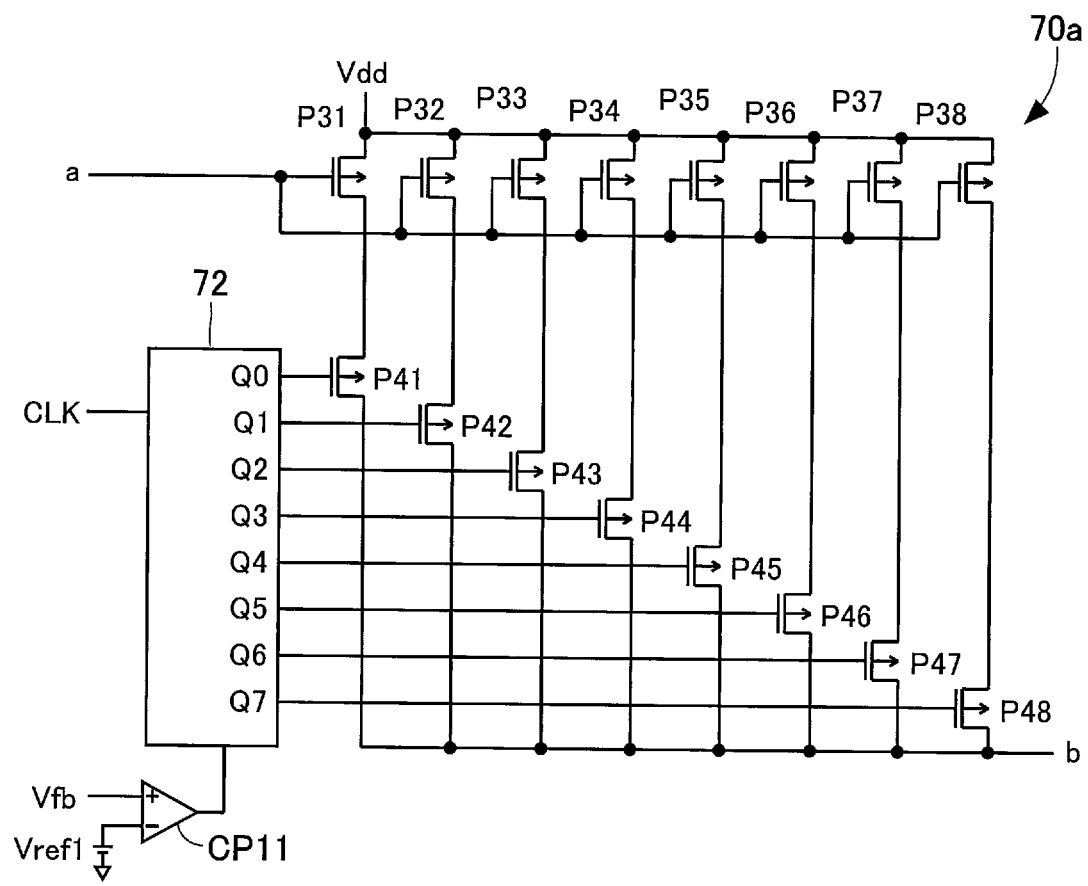
FIG. 11 illustrates a schematic configuration of a jitter control circuit in the oscillator in FIG. 10.
Figure 12:
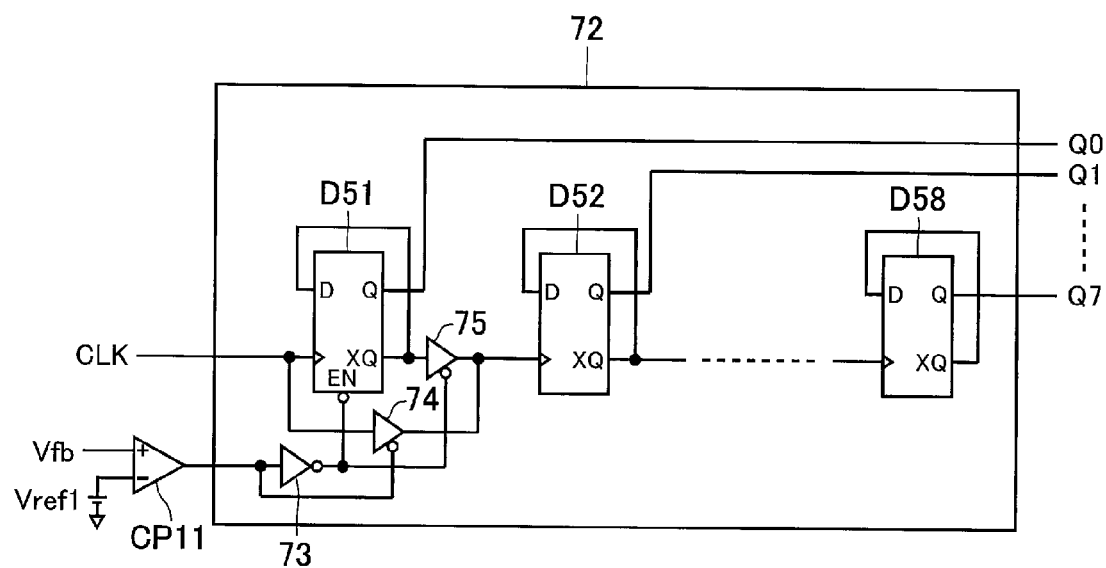
FIG. 12 illustrates a schematic configuration of a counter in the jitter control circuit in FIG. 11.
Figure 13A:
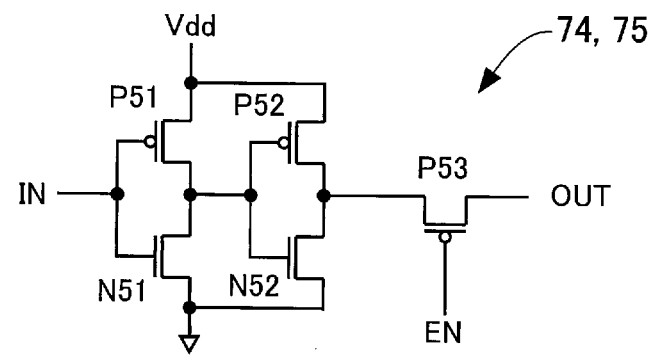
FIGS. 13A and 13B illustrate configuration examples of a tri-state buffer.
Figure 13B:
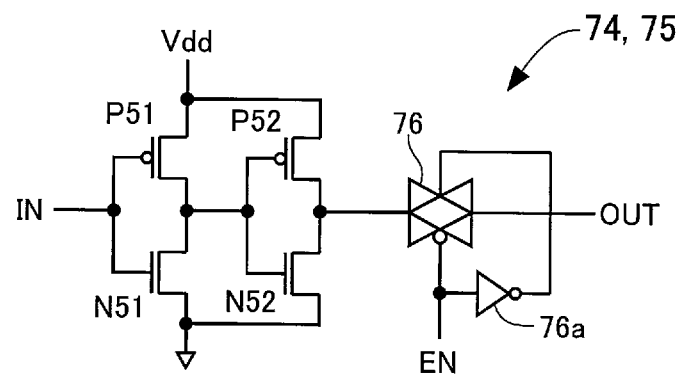

FIG. 10 illustrates a schematic configuration of an oscillator 34 included in a control IC 8 of a switching power supply according to a first embodiment. FIG. 11 illustrates a schematic configuration of a jitter control circuit 70a in the oscillator 34 in FIG. 10. FIG. 12 illustrates a schematic configuration of a counter 72 in the jitter control circuit 70a in FIG. 11. FIGS. 13A and 13B illustrate configuration examples of a tri-state buffer.

The oscillator 34 includes terminals Vdd (2.5 V) and Vdd (5 V) that receive the voltages outputted from an internal power supply circuit 33 (see FIG. 23), a feedback terminal FB that receives a feedback voltage FB, which corresponds to an error signal obtained by converting the level of the load into a voltage, and a timing resistor connection terminal RT.

The timing resistor connection terminal RT is connected to a timing resistor R_RT, which is an external component of this control IC 8.

The feedback terminal FB is connected to an amplifier FB_A. The output voltage from this amplifier FB_A is represented by (FB+(FB−1.06 V)×R12/R11), and the amplification factor=R12/R11 is determined by resistors R11 and R12. For example, the amplification factor of the amplifier FB_A is 10. When the feedback voltage FB at the feedback terminal FB falls below 1.06 V, the output from the amplifier FB_A becomes smaller than the feedback voltage FB. However, since the low-potential-side power supply voltage of the amplifier FB_A is at the ground potential, the minimum output from the amplifier FB_A is zero.

A multi-input amplifier RT_A has two inverting input terminals. The multi-input amplifier RT_A selects one of the inverting input terminals receiving the lower input voltage and virtually short-circuits the selected inverting input terminal and a non-inverting input terminal. For example, when the load is heavy, the feedback voltage FB is high, and the output from the amplifier FB_A is 2.5 V or more of Vdd (2.5 V), the voltage at the non-inverting input terminal of the multi-input amplifier RT_A reaches 2.5 V.

In contrast, when the load is light and the feedback voltage FB is light, since the output from the amplifier FB_A changes 10 times the change of the feedback voltage FB, the output from the amplifier FB_A reaches Vdd (2.5V) or less. Thus, the voltage at the non-inverting input terminal of the multi-input amplifier RT_A reaches the same level of the output from the amplifier FB_A, namely, Vdd (2.5 V) or less.

The output from the multi-input amplifier RT_A is connected to the gates of transistors P21 and P22. The transistors P22 and P21, transistors N21 and N22, transistors P23 and P24, transistors N23, N24, and N26, and transistors P25 and P26 form current mirror circuits, respectively. A current outputted from the current mirror circuit formed by the transistors P22 and P21 is inputted to the current mirror circuit formed by the transistors N21 and N22. A current outputted from the current mirror circuit formed by the transistors N21 and N22 is inputted to the current mirror circuit formed by the transistors P23 and P24. A current outputted from the current mirror circuit formed by the transistors P23 and P24 is inputted to the current mirror circuit formed by the transistors N23, N24, and N26. In addition, a current outputted from the current mirror circuit formed by the transistors N23, N24, and N26 (the drain current of the transistor N24) is inputted to the current mirror circuit formed by the transistors P25 and P26.

In addition, the transistors P26 and N26 connected downstream of the transistors P25 and N24 form current sources, and transistors P27 and N25 form switches that switch charging and discharging of a capacitor C. The gates of these switching transistors P27 and N25 are connected to a circuit including resistors R1 to R3 that set the upper and lower limits of the triangular oscillation waveforms, comparators CP1 and CP2, and an RS flip flop RSFF. In this case, the above high-side reference voltage VrefH is 5×(R2+R3)/(R1+R2+R3) and the low-side reference voltage VrefL is 5×R3/(R1+R2+R3). In addition, the RS flip flop RSFF that receives the output from the comparators CP1 and CP2 outputs an oscillation signal Dmax. The transistor P21 is connected in parallel to the constant current source I0. In this way, the oscillation is prevented from being stopped even when the charging or discharging of the capacitor C is stopped after the feedback voltage FB is decreased and the output from the amplifier FB_A reaches zero.

In addition, since the output from the multi-input amplifier RT_A is inputted to the gate of the transistor P22, the output controls the current that flows through the timing resistor R_RT. A terminal voltage Vrt appears at the timing resistor connection terminal RT. Since the multi-input amplifier RT_A is formed by an operational amplifier, by virtually short-circuiting input terminals of the operational amplifier, the value of the voltage Vrt at the timing resistor connection terminal RT is made equal to the lower one of Vdd (2.5 V) and the output voltage from the amplifier FB_A. Thus, the current that flows through the transistor P22 is represented by (voltage Vrt/resistance of timing resistor R_RT). In addition, since the transistors P22 and P21 form a current mirror circuit, the current that flows through the transistor P21 is equal to or proportional to the current that flows through the transistor P22.

If the jitter control circuit 70a described below is not present, the oscillator 34 basically operates as follows. Namely, a current obtained as the sum of a current that flows through the transistor P21 and a current from the constant current source I0 flows through a plurality of current mirror circuits. Consequently, a current equal to or proportional to this current flows through the transistors P25, P26, N24, and N26. The transistors P27 and N25 are switched by the voltage at the RS flip flop RSFF and switch charging and discharging of the capacitor C.

Through this operation described above, when the load is heavy where the terminal voltage at the feedback terminal FB is high, the multi-input amplifier RT_A selects the fixed value Vdd (2.5 V) as an input so that the voltage Vrt at the timing resistor connection terminal RT is equal to 2.5 V. Thus, a constant oscillation frequency is maintained. In contrast, when the terminal voltage at the feedback terminal FB is decreased to 2.5 V or less, the multi-input amplifier RT_A selects the output from the amplifier FB_A as an input. Thus, the voltage Vrt at the timing resistor connection terminal RT changes linearly in accordance with the level of the load. In this way, when the terminal voltage at the feedback terminal FB is decreased to 2.5 V or less, since the charging and discharging current of the capacitor C is reduced, the oscillation frequency is decreased. Thus, by changing the voltage Vrt at the timing resistor connection terminal RT as described above when the load is light, the oscillation frequency is decreased in accordance with the load.

The oscillator 34 further includes the jitter control circuit 70a that gives jitter to the triangular oscillation waveforms generated by charging and discharging of the capacitor C in the above basic operation. As illustrated in FIG. 11, this jitter control circuit 70a includes an 8-bit counter 72, transistors P31 to P38 connected in parallel to each other, transistors P41 to P48 connected to outputs Q0 to Q7 from the 8-bit counter 72, and a comparator CP11.

The drain terminals of the transistors P41 to P48 are connected to each other and supply an output current b to the transistor N23 in FIG. 10. A current obtained as a sum of the current from the transistor P24 and this output current b flows through the transistor N23. As a result, a current that is equal to or proportional to the current obtained as a sum of the current from the transistor P24 and the output current b flows through the transistors P26 and N26. Thus, jitter based on the output current b is given to the oscillation frequency, and frequency diffusion is performed. In many cases, by changing the size of at least one of the transistors included in the current mirror circuits, the current flowing through the transistor N26 is made larger than the current flowing through the transistor P26.

The 8-bit counter 72 has a clock terminal CLK that receives the inversion signal of the oscillation signal Dmax. In this way, each time the 8-bit counter 72 receives a pulse of the inversion signal of the oscillation signal Dmax, the 8-bit counter 72 performs a count-up operation, and when the maximal value is reached, the count is set back to 0 and the count-up operation is continued again.

The transistors P31 to P38 have their gates connected to the gate of the transistor P23 and form a current mirror circuit with the transistor P23. The transistors P31 to P38 have different sizes so that a larger current flows through a transistor located more downstream. The transistors P31 to P38 are connected in series with the transistors P41 to P48, respectively.

The comparator CP11 has a non-inverting input terminal that receives the feedback voltage FB or the output from the amplifier FB_A that amplifies the feedback voltage FB (the output from the amplifier FB_A in FIG. 10). The comparator CP11 has an inverting input terminal that receives a reference voltage Vref1. The reference voltage Vref1 corresponds to the output voltage from the amplifier FB_A at the operating frequency (fc=40 kHz) at which the 7-bit curve and the 8-bit curve intersect in FIG. 8. Thus, assuming that the output voltage from amplifier FB_A is represented by Vfb, the 8-bit counter 72 performs an 8-bit counter operation when Vref1≤Vfb and performs a 7-bit counter operation when Vref1>Vfb.

As illustrated in FIG. 12, the 8-bit counter 72 includes eight D flip flops D51 to D58 connected in series with each other. More specifically, the D flip flop D51 has a clock input connected to the clock terminal CLK of the 8-bit counter 72, an output Q connected to the least-significant-bit output Q0 of the 8-bit counter 72, and an inverting output XQ connected to its data input terminal D. In addition, the D flip flop D51 includes an enable terminal EN connected to the output from an inverter 73. The output from the comparator CP11 is inputted to the inverter 73. The D flip flop D52 has a clock input connected to the clock terminal CLK of the 8-bit counter 72 via a tri-state buffer 74 and connected to the inverting output XQ of the D flip flop D51 via a tri-state buffer 75. The tri-state buffer 74 has an enable terminal connected to the output from the comparator CP11, and the tri-state buffer 75 has an enable terminal connected to the output from the inverter 73. The D flip flop D52 has an output Q connected to the output Q1 of the 8-bit counter 72 and has an inverting output XQ connected to its data input D and a clock terminal of the next D flip flop D53. The D flip flop D52 to the most-significant-bit D flip flop D58 are connected in series with each other in a like manner, and these flip flops D51 to D58 form an 8-bit counter. The tri-state buffers 74 and 75 are enabled exclusively and form a selection circuit that selects the clock input supplied to the D flip flop D51 (clock signal CLK) or the inverting output XQ of the D flip flop D51 as a clock input supplied to the D flip flop D52.

As illustrated in FIG. 13A, each of the tri-state buffers 74 and 75 includes two complementary metal oxide semiconductor (CMOS) inverters and a switch. Namely, in each of the tri-state buffers 74 and 75, the first-stage CMOS inverter including transistors P51 and N51 and the second-stage CMOS inverter including transistors P52 and N52 are connected in series with each other, so as to form a buffer. In addition, a transistor P53 serving as a switch is connected in series with the output side of the buffer.

Each of these tri-state buffers 74 and 75 has an enable terminal EN, an output terminal OUT, and an input terminal IN. When an L-level signal is inputted to the enable terminal EN, the transistor P53 is turned on, and a signal having the same level as that inputted to the input terminal IN is outputted to the output terminal OUT. When an H-level signal is inputted to the enable terminal EN, the transistor P53 is turned off, and the output terminal OUT is brought in a high impedance state. Thus, no signal is transmitted from the input terminal IN to the output terminal OUT.

The switch arranged at the output of each of the tri-state buffers 74 and 75 may be configured by a transfer gate 76 and an inverter 76a instead of the transistor P53, as illustrated in FIG. 13B. If the transfer gate 76 and the inverter 76a are used, when an L-level signal is inputted to an enable terminal EN of the switch, the transfer gate 76 is brought in a conduction state. When an H-level signal is inputted to the enable terminal EN, the transfer gate 76 is brought in a high impedance state.

With the 8-bit counter 72 illustrated in FIG. 12, when the output voltage Vfb from the amplifier FB_A is equal to or more than the reference voltage Vref1, namely, when the operating frequency fc is equal to or more than 40 kHz, the comparator CP11 outputs an H-level signal, and the inverter 73 outputs an L-level signal. Accordingly, the tri-state buffer 74 is disabled, and the tri-state buffer 75 is enabled. Namely, the output from the least-significant-bit D flip flop D51 is transmitted to the next D flip flop D52. Thus, the 8-bit counter 72 operates as an 8-bit counter.

Next, when the load becomes lighter and the output voltage Vfb from the amplifier FB_A falls below the reference voltage Vref1, namely, when the operating frequency fc falls below 40 kHz, the comparator CP11 outputs an L-level signal and the inverter 73 outputs an H-level signal. Accordingly, the tri-state buffer 74 is enabled, and the tri-state buffer 75 is disabled. Namely, the least-significant-bit D flip flop D51 is disabled. Thus, the clock signal CLK inputted to the 8-bit counter 72 is directly inputted to the clock terminal of the D flip flop D52 via the tri-state buffer 74, and the 8-bit counter 72 operates as a 7-bit counter.

Second Embodiment

Figure 14:
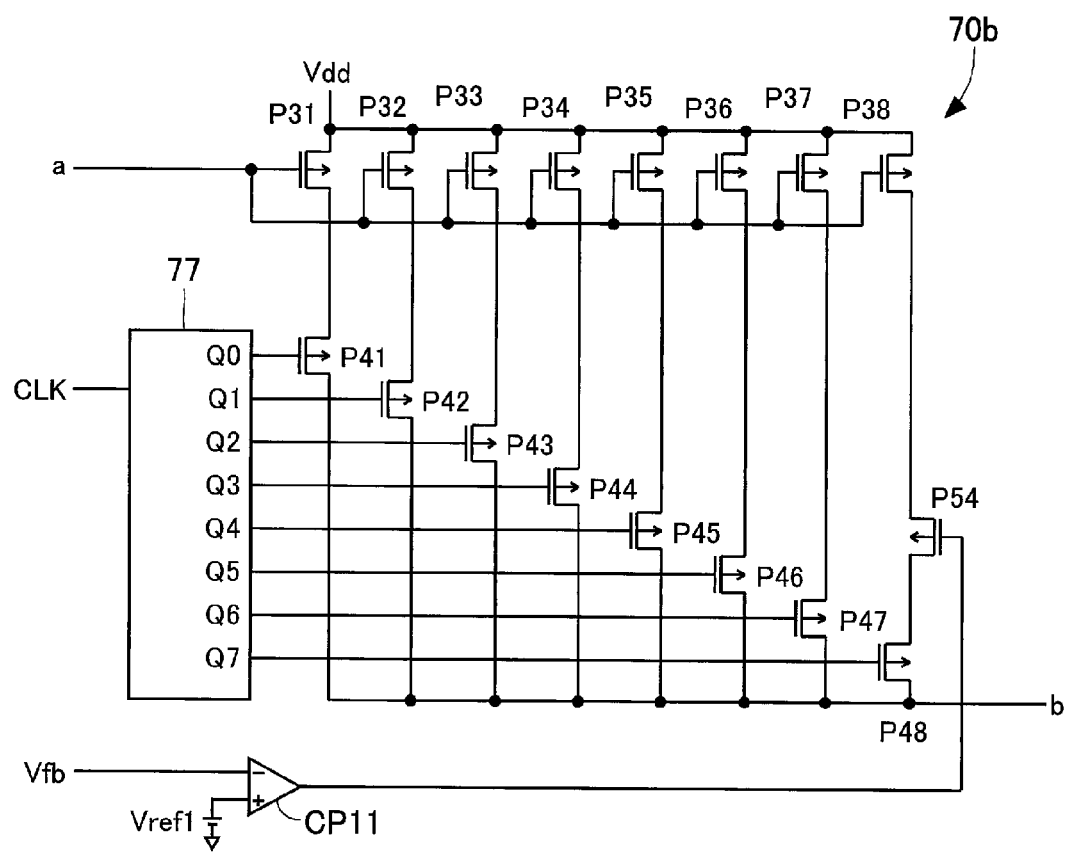
FIG. 14 illustrates a schematic configuration of a jitter control circuit in an oscillator in a control IC in a switching power supply according to a second embodiment.
Figure 15:
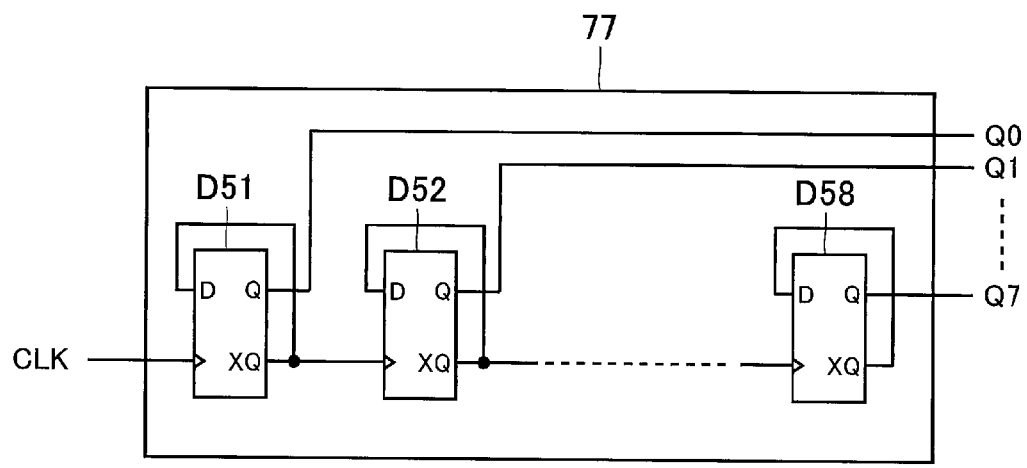
FIG. 15 illustrates a schematic configuration of a counter in the jitter control circuit in FIG. 14.

FIG. 14 illustrates a schematic configuration of a jitter control circuit 70b in an oscillator in a control IC in a switching power supply according to a second embodiment. FIG. 15 illustrates a schematic configuration of a counter 77 in the jitter control circuit 70b in FIG. 14. FIGS. 14 and 15 and FIGS. 11 and 12 share the same components or equivalent components. These components are denoted by like reference characters, and detailed description thereof will be omitted.

With the jitter control circuit 70a according to the above first embodiment, by disabling the least-significant-bit D flip flop D51, the 8-bit counter 72 is operated as a 7-bit counter. In contrast, with this jitter control circuit 70b according to the second embodiment, by disabling the function of the transistor P48 connected to the most-significant-bit output Q7, the bit number is switched from 8 to 7.

As illustrated in FIG. 15, the 8-bit counter 77 according to the second embodiment is configured as a normal 8-bit counter by connecting the eight D flip flop D51 to D58 in series with each other.

In the jitter control circuit 70b, a transistor P54 is connected in series with the transistor P48 connected to the most-significant-bit output Q7, and this transistor P54 has a gate connected to the output of the comparator CP11. In this embodiment, the comparator CP11 is configured to receive the output voltage Vfb via its inverting input and the reference voltage Vref1 via its non-inverting input.

With this jitter control circuit 70b, when the output voltage Vfb from the amplifier FB_A is equal to or more than the reference voltage Vref1, namely, when the operating frequency fc is 40 kHz, the comparator CP11 outputs an L-level signal. Accordingly, the transistor P54 is turned on, and the jitter control circuit 70b operates with 8 bits.

Next, when the load becomes lighter and the output voltage Vfb from the amplifier FB_A falls below the reference voltage Vref1, namely, when the operating frequency fc falls below 40 kHz, the comparator CP11 outputs an H-level signal. Accordingly, the transistor P54 is turned off, and the most-significant-bit output is forcibly disabled. Thus, since the bit number of the jitter control circuit 70b is switched from 8 to 7, the jitter control circuit 70b operates with 7 bits. Namely, while the counter 77 itself operates with 8 bits, since the most-significant-bit output Q7 is separated from the output current b, the value of the output current b is controlled by the other lower 7 bits of the outputs Q0 to Q7 of the counter 77. In this case, the modulation cycle corresponds to a length of 128 cycles of the clock signal CLK.

In the above first and second embodiments, the bit number is switched from 8 to 7 by disabling the least significant bit or the most significant bit among the 8 bits. However, the bit to be disabled is not limited to the least significant bit or the most significant bit. Namely, any 1 bit between the least significant bit and the most significant bit may be disabled to switch the bit number from 8 to 7.

The above embodiments have been described by using switching power supplies whose operating frequency changes between 25 kHz and 65 kHz. Hereinafter, a switching power supply whose operating frequency changes between 25 kHz and 100 kHz will be described.

Figure 16:
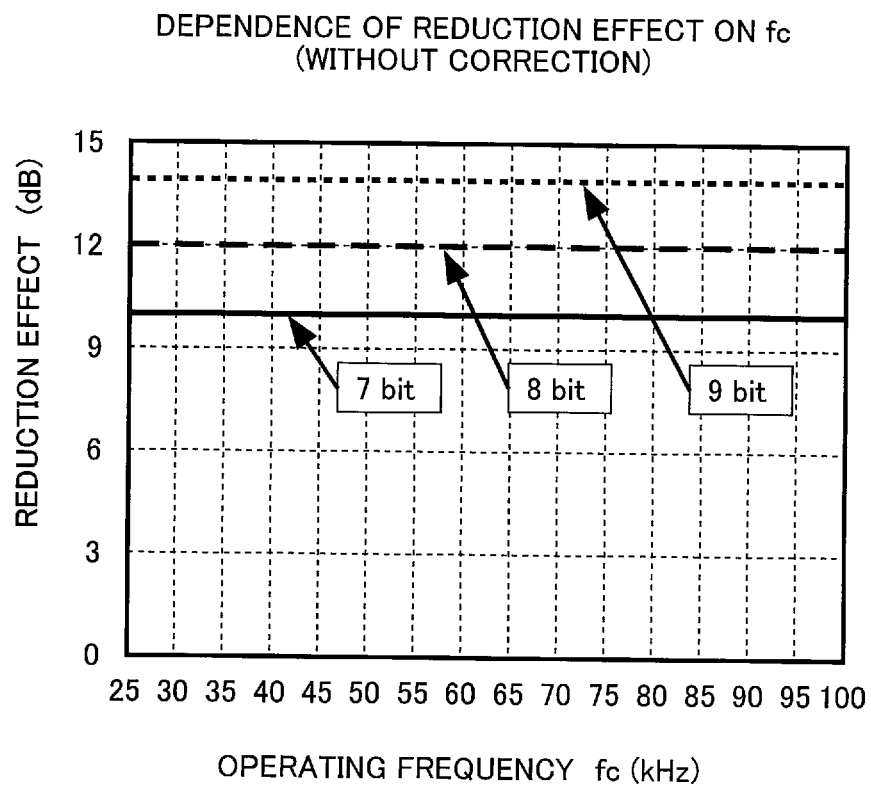
FIG. 16 illustrates dependence of reduction effects on the operating frequency extended to 100 kHz (without correction)
Figure 17:
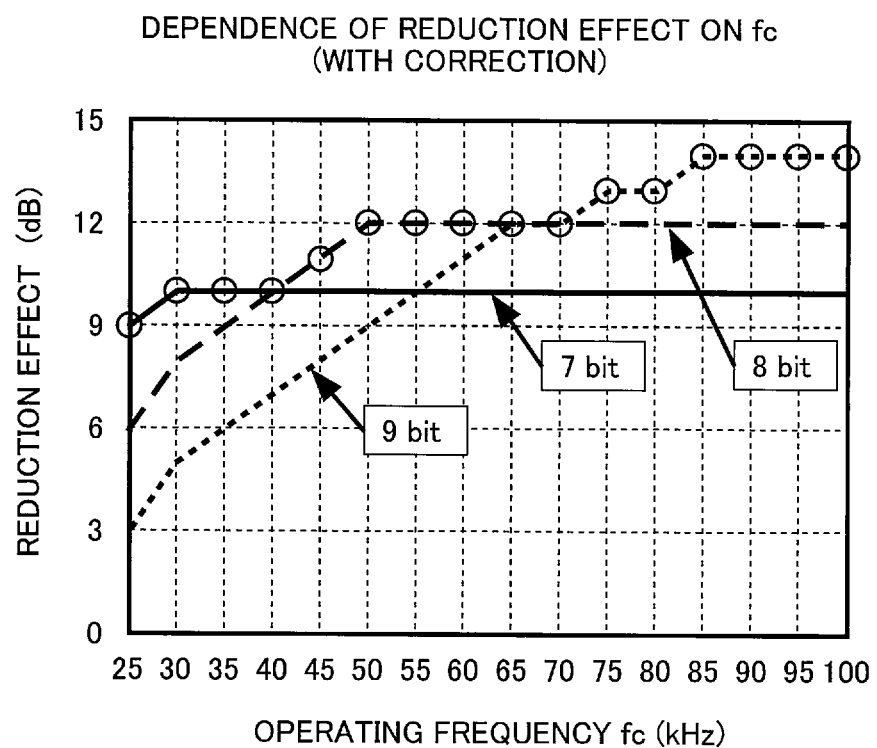
FIG. 17 illustrates dependence of reduction effects on the operating frequency extended to 100 kHz (with correction)
Figure 18:
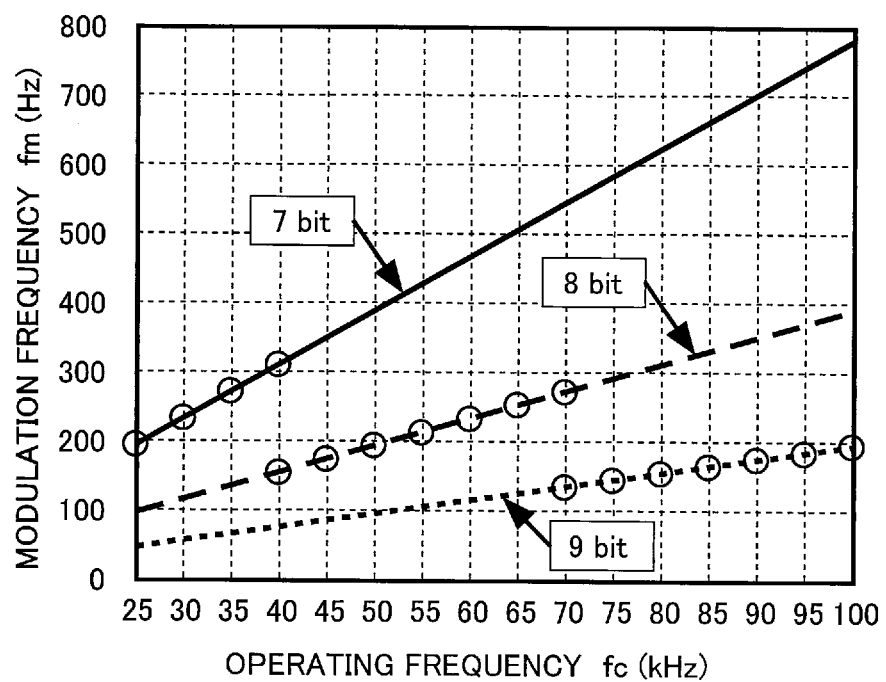
FIG. 18 illustrates dependence of the modulation frequency on the operating frequency.

FIG. 16 illustrates dependence of reduction effects on the operating frequency extended to 100 kHz (without correction). FIG. 17 illustrates dependence of reduction effects on the operating frequency extended to 100 kHz (with correction). FIG. 18 illustrates dependence of the modulation frequency on the operating frequency.

When the operating frequency fc changes between 25 kHz and 100 kHz, certain reduction effects are calculated by the calculation expression using the Bessel function. More specifically, as illustrated in FIG. 16, it is seen that reduction effects of about 10 dB, 12 dB, and 14 dB are obtained when the counter operates with 7 bits, 8 bits, and 9 bits, respectively. However, in the graph in FIG. 16, no correction is made, namely, the resolution bandwidth RBW is not considered. FIG. 17 illustrates reduction effects when correction is made, namely, when the resolution bandwidth RBW is considered. Namely, when the counter operates with 7 bits and when the operating frequency fc is 25 kHz, the reduction effect is 9 dB. When the operating frequency fc is between 30 kHz and 100 kHz, the reduction effect is maintained at 10 dB. In addition, when the counter operates with 8 bits and when the operating frequency fc is between 25 kHz and 50 kHz, the reduction effect is between 6 dB and 12 dB. When the operating frequency fc is between 50 kHz and 100 kHz, the reduction effect is maintained at 12 dB. In addition, when the counter operates with 9 bits and when the operating frequency fc is between 25 kHz and 65 kHz, the reduction effect is between 3 dB and 12 dB. When the operating frequency fc is between 65 kHz and 70 kHz, the reduction effect is maintained at 12 dB. When the operating frequency fc is between 75 kHz and 80 kHz, the reduction effect is maintained 13 dB. When the operating frequency fc is between 85 kHz and 100 kHz, the reduction effect is maintained at 14 dB.

It is seen from FIG. 17 that the 7-bit curve and the 8-bit curve intersect when the operating frequency fc is 40 kHz and the 8-bit curve and the 9-bit curve overlap when the operating frequency fc is 65 kHz and 70 kHz. Namely, it is seen that the reduction effects are optimized throughout the range between 25 kHz and 100 kHz by switching the bit number between 7 and 8 when fc=40 kHz and by switching the bit number between 8 and 9 when fc=70 kHz.

Thus, as illustrated in FIG. 18, the modulation frequency fm changes depending on the operating frequency fc. More specifically, the modulation frequency fm changes on the 7-bit curve when fc=25 kHz to 40 kHz, on the 8-bit curve when fc=40 kHz to 70 kHz, and on the 9-bit curve when fc=70 kHz to 100 kHz.

As described above, it is seen that, in the case of a switching power supply whose operating frequency fc changes between 25 kHz and 100 kHz, the maximal values of the reduction effects are switched at two points, namely, when the operating frequency fc is 40 kHz and 70 kHz. Thus, the bit number of the jitter control circuit needs to be switched at the two points, namely, when the operating frequency fc is 40 kHz and 70 kHz. Hereinafter, circuit examples that realize this switching will be described.

Third Embodiment

Figure 19:
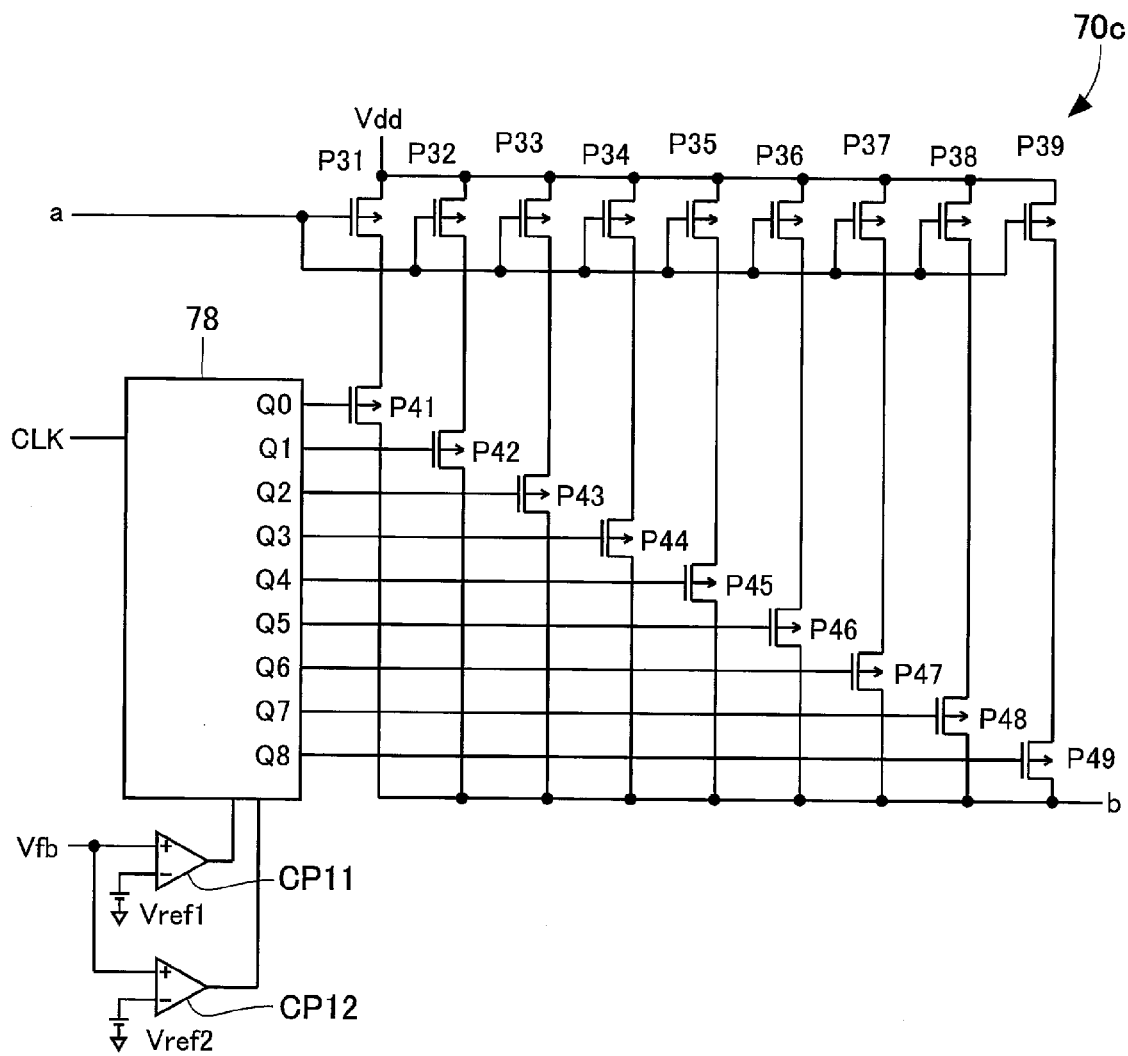
FIG. 19 illustrates a schematic configuration of a jitter control circuit in an oscillator in a control IC in a switching power supply according to a third embodiment.
Figure 20:
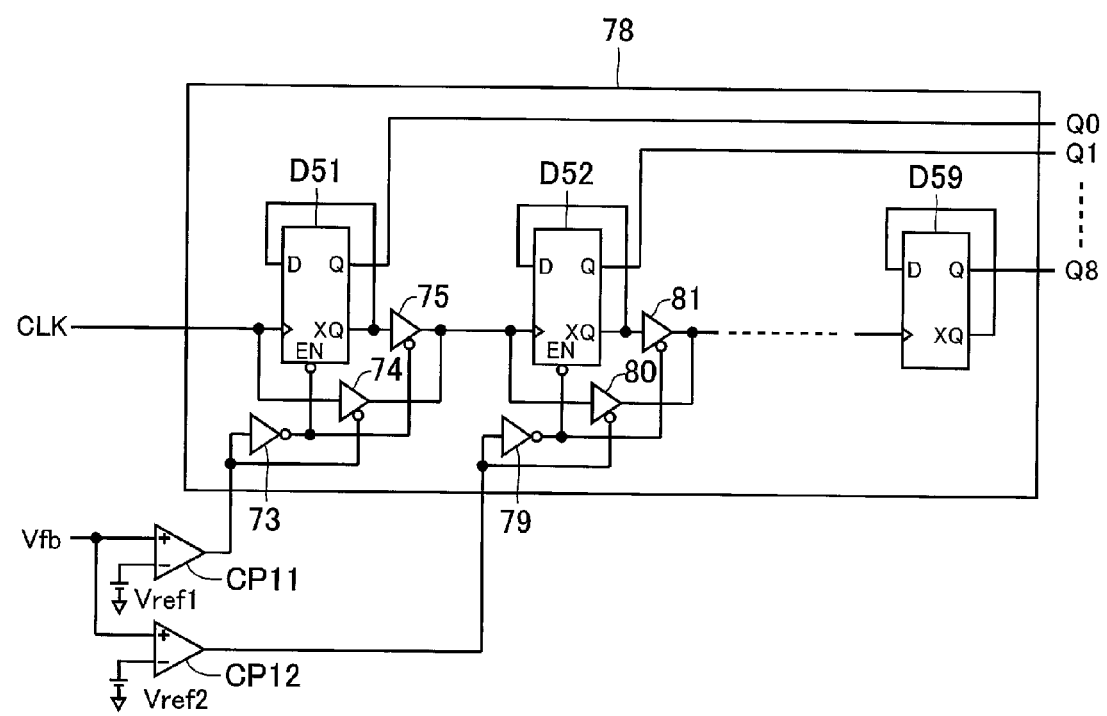
FIG. 20 illustrates a schematic configuration of a counter in the jitter control circuit in FIG. 19.

FIG. 19 illustrates a schematic configuration of a jitter control circuit 70c in an oscillator in a control IC in a switching power supply according to a third embodiment. FIG. 20 illustrates a schematic configuration of a counter 78 in the jitter control circuit 70c in FIG. 19. FIGS. 19 and 20 and FIGS. 11 and 12 share the same components or equivalent components. These components are denoted by like reference characters, and detailed description thereof will be omitted.

As illustrated in FIG. 19, the jitter control circuit 70c in the switching power supply according to the third embodiment includes the 9-bit counter 78, transistors P31 to P39 connected in parallel to each other, transistors P41 to P49 connected to outputs Q0-Q8 from the 9-bit counter 78, and comparators CP11 and CP12.

The comparator CP11 has a non-inverting input that receives the output voltage Vfb from the amplifier FB_A and an inverting input that receives a reference voltage Vref1. The reference voltage Vref1 has a value that corresponds to the FB voltage at the operating frequency (fc=70 kHz) at which the 8-bit curve and the 9-bit curve in FIG. 17 intersect. The comparator CP12 has a non-inverting input that receives the output voltage Vfb from the amplifier FB_A and an inverting input that receives a reference voltage Vref2 (<Vref1). The reference voltage Vref2 has a value that corresponds to the FB voltage at the operating frequency (fc=40 kHz) at which the 7-bit curve and the 8-bit curve in FIG. 17 intersect. Thus, when the output voltage Vfb from the amplifier FB_A is Vref1 or more, the 9-bit counter 78 performs a 9-bit counter operation. When the output voltage Vfb is Vref2≤Vfb<Vref1, the 9-bit counter 78 performs an 8-bit counter operation. In addition, the output voltage Vfb is less than Vref2, the 9-bit counter 78 performs a 7-bit counter operation.

As illustrated in FIG. 20, the 9-bit counter 78 includes nine D flip flops D51 to D59 connected in series with each other. The 9-bit counter 78 is configured to enable or disable the least and second-least significant bits. As is the case with the 8-bit counter illustrated in FIG. 12, the least-significant-bit D flip flop D51 is enabled or disabled by a comparator CP11, an inverter 73, and tri-state buffers 74 and 75. The D flip flop D52 in the next stage has the same configuration and is enabled or disabled by a comparator CP12, an inverter 79, and tri-state buffers 80 and 81. As is the case with the tri-state buffers 74 and 75, the tri-state buffers 80 and 81 form a selection circuit.

With this 9-bit counter 78, when the output voltage Vfb from the amplifier FB_A is the reference voltage Vref1 or more, namely, when the operating frequency fc is 70 kHz or more, the comparators CP11 and CP12 output an H-level signal and the inverters 73 and 79 output an L-level signal. Accordingly, since disabled, the tri-state buffers 74 and 80 do not relay the clock signal CLK. However, since the tri-state buffers 75 and 81 are enabled, the least-significant-bit D flip flop D51 and the second-least-significant-bit D flip flop D52 are enabled. Namely, the 9-bit counter 78 operates as a 9-bit counter.

Next, when the load becomes lighter and the output voltage Vfb from the amplifier FB_A falls below the reference voltage Vref1, namely, when the operating frequency fc falls below 70 kHz, the comparator CP11 outputs an L-level signal and the inverter 73 outputs an H-level signal. Thus, the tri-state buffer 74 is enabled, and the clock signal CLK is directly inputted to the D flip flop D52, not via the D flip flop D51. In addition, since the tri-state buffer 75 is enabled and the inverting output XQ of the D flip flop D51 is separated from the circuit, the least-significant-bit D flip flop D51 is disabled. In contrast, since the comparator CP12 maintains its output, the D flip flop D52 is continuously enabled. Namely, the 9-bit counter 78 operates as an 8-bit counter.

When the load becomes even lighter and the output voltage Vfb from the amplifier FB_A falls below the reference voltage Vref2, namely, when the operating frequency fc falls below 40 kHz, the comparator CP12 outputs an L-level signal and the inverter 79 outputs an H-level signal. Since the tri-state buffers 74 and 80 are enabled, the clock signal CLK bypasses the D flip flops D51 and D52. In addition, since the tri-state buffers 75 and 81 are disabled, the inverting outputs XQ of the D flip flops D51 and D52 are separated from the circuit. Namely, in addition to the D flip flop D51, the D flip flop D52 is disabled. Having the least significant bit and the second-least significant bit disabled in this way, the 9 bit counter 78 operates as a 7-bit counter.

In this third embodiment, when the 9-bit counter 78 operates as an 8-bit counter, the least-significant-bit D flip flop D51 is disabled. However, the 9 bit counter 78 may be operated as an 8-bit counter by disabling any one of the downstream D flip flops D52 to D58, instead of the least-significant-bit D flip flop D51. In this case, the above selection circuit is included in the D flip flop that is disabled.

Fourth Embodiment

Figure 21:
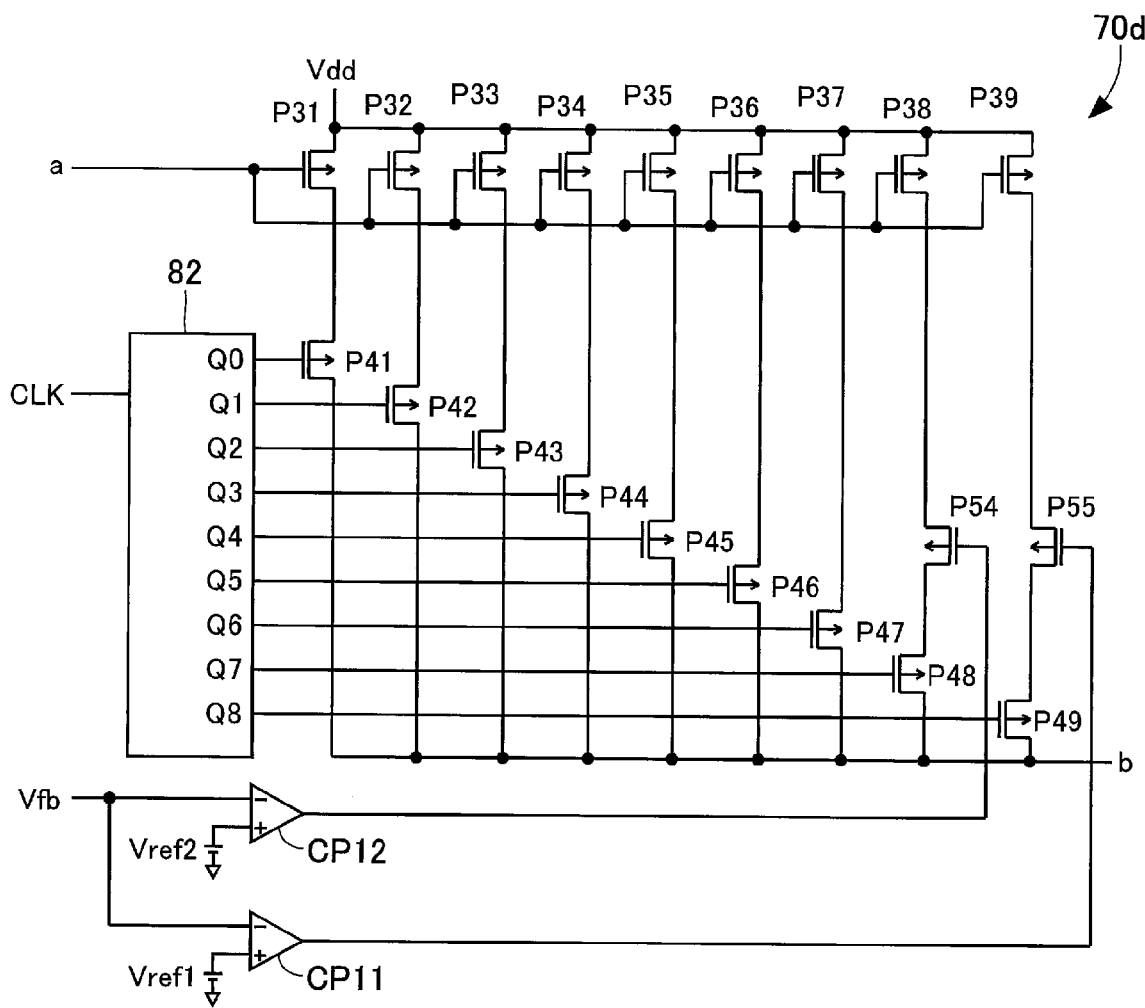
FIG. 21 illustrates a schematic configuration of a jitter control circuit in an oscillator in a control IC in a switching power supply according to a fourth embodiment.

FIG. 21 illustrates a schematic configuration of a jitter control circuit 70d in an oscillator in a control IC in a switching power supply according to a fourth embodiment. FIGS. 21 and 14 share the same components or equivalent components. These components are denoted by like reference characters, and detailed description thereof will be omitted.

With the above jitter control circuit 70c according to the third embodiment, by selectively disabling the least-significant-bit D flip flop D51 and the second-least-significant-bit D flip flop D52, the 9 bit counter 78 is operated as an 8- or 7-bit counter. In contrast, with the jitter control circuit 70d according to the fourth embodiment, by selectively disabling the transistors P48 and P49 connected to the most-significant-bit output Q8 and the second-most-significant-bit output Q7, the bit number is switched from 9 to 8 or 7.

To this end, the 9-bit counter 82 according to the fourth embodiment includes a normal configuration as a 9 bit counter. Namely, the 9-bit counter 82 has a stage in addition to the stages included in the 8-bit counter 77 illustrated in FIG. 15. Namely, the 9-bit counter 82 has nine stages in total.

In the jitter control circuit 70d, transistors P54 and P55 are connected in series with the transistors P48 and P49 connected to the most-significant-bit output Q8 and second-most-significant-bit output Q7, respectively. These transistors P55 and P54 have their gates connected to the outputs of the comparators CP11 and CP12, respectively.

With the jitter control circuit 70d, when the output voltage Vfb from the amplifier FB_A is equal to or more than the reference voltage Vref1 (Vref2<Vref1), namely, when the operating frequency fc is 70 kHz or more, the comparators CP11 and CP12 output an L-level signal. Accordingly, since the transistors P54 and P55 are turned on, the jitter control circuit 70d operates with 9 bits.

Next, when the load becomes lighter and the output voltage Vfb from the amplifier FB_A falls below the reference voltage Vref1, namely, when the operating frequency fc falls below 70 kHz, the comparator CP11 outputs an H-level signal. Thus, since the transistor P55 is turned off, the transistor P49 is disabled. Namely, since the bit number of the jitter control circuit 70d is switched from 9 to 8, the jitter control circuit 70d operates with 8 bits.

When the load becomes even lighter and the output voltage Vfb from the amplifier FB_A falls below the reference voltage Vref2, namely, when the operating frequency fc falls below 40 kHz, the comparator CP12 outputs an H-level signal, and the transistor P54 is turned off. Accordingly, the most-significant-bit transistor P49 and second-most-significant-bit transistor P48 are disabled, the bit number of the jitter control circuit 70d is switched to 7. Thus, the jitter control circuit 70d operates with 7 bits.

In the third and fourth embodiments, the bit number is switched between 9 and 8 when the operating frequency is at 70 kHz. However, since the same reduction effect is obtained when the operating frequency is at 65 kHz, the switching may be performed at 65 kHz.

In addition, the above embodiments have been described by using a flyback switching power supply, which receives a commercial AC power supply as its input, as an example. However, the present technique is not limited to this type of switching power supplies. The present technique is also applicable to switching power supplies, which receive a DC power supply such as a battery as their input. The present technique is also applicable to switching power supplies that use separate inductance instead of a transformer.

It is also needless to say that any combination of the components in the above embodiments falls within the scope of the present technique.

With the above configurations, an optimized frequency diffusion function is achieved. Thus, since the maximum reduction effect is obtained in the entire operating frequency range, no or less additional filters are needed. Namely, the present technique provides the advantages of minimizing the apparatus size and the cost increase.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply control circuit that causes a switching element connected to an input voltage source to perform switching to generate and output a predetermined direct-current voltage to a load and that changes an operating frequency of the switching based on the load, the switching power supply control circuit comprising:
    an oscillator that determines the operating frequency by charging a capacitor with a predetermined current based on a magnitude of the load or discharging the capacitor; and
    a jitter control circuit that is included in the oscillator and that performs frequency diffusion by modulating the operating frequency with a modulation frequency based on a changeable bit number of a counter,
    wherein the jitter control circuit switches the bit number of the counter at an operating frequency corresponding to a point of intersection of calculated curves each of which indicates a conducted electromagnetic interference reduction effect with respect to an operating frequency for each bit number.

2. The switching power supply control circuit according to claim 1, wherein the jitter control circuit switches the bit number when a feedback signal that determines the operating frequency that changes based on the load reaches a value that corresponds to the operating frequency corresponding to the point of intersection of calculated curves.

3. The switching power supply control circuit according to claim 2,
    wherein, when the operating frequency that changes based on the load has a range of between 25 kHz and 65 kHz and when the operating frequency that changes based on the load is 40 kHz, the curves intersect, and
    wherein the jitter control circuit sets the bit number of the counter to 8 when the operating frequency that changes based on the load is 40 kHz or more and to 7 when the operating frequency that changes based on the load is less than 40 kHz.

4. The switching power supply control circuit according to claim 2,
    wherein, when the operating frequency that changes based on the load has a range of between 25 kHz and 100 kHz and when the operating frequency that changes based on the load is one of 40 kHz or 70 kHz, the curves intersect, and
    wherein the jitter control circuit sets the bit number of the counter to 9 when the operating frequency that changes based on the load is 70 kHz or more, to 8 when the operating frequency that changes based on the load is 40 kHz or more and less than 70 kHz, and to 7 when the operating frequency that changes based on the load is less than 40 kHz.

5. The switching power supply control circuit according to claim 1, wherein, when the bit number of the counter is n, the jitter control circuit switches the bit number from n to (n−1) by disabling one bit of the counter.

6. The switching power supply control circuit according to claim 5, wherein the jitter control circuit disables a least significant bit of the counter.

7. The switching power supply control circuit according to claim 5, wherein the jitter control circuit disables a most significant bit of the counter.

8. The switching power supply control circuit according to claim 5, wherein the jitter control circuit disables any one bit of the counter other than a least significant bit and a most significant bit of the counter.

9. The switching power supply control circuit according to claim 5,
wherein the jitter control circuit comprises:
a comparator that compares a feedback signal with a reference voltage that has a value that corresponds to the operating frequency corresponding to the point of intersection of calculated curves; and
a selection circuit that selects, based on an output from the comparator, a clock signal supplied to a D flip flop to be disabled among eight D flip flops included in the counter or an inverting output signal of the D flip flop to be disabled and that supplies a clock signal to a next-stage D flip flop.

10. The switching power supply control circuit according to claim 5,
wherein the jitter control circuit comprises:
a comparator that compares a feedback signal with a reference voltage that has a value that corresponds to the operating frequency corresponding to the point of intersection of calculated curves; and
a second transistor that is connected in series with a first transistor that is turned on or off based on the bit disabled among the D flip flops included in the counter and that is turned on and off based on an output from the comparator.

11. The switching power supply control circuit according to claim 1, wherein the bit number of the counter is n, the jitter control circuit switches the bit number from n to (n−1) and (n−2) by disabling one bit and two bits of the counter, respectively.

12. The switching power supply control circuit according to claim 11, wherein the jitter control circuit disables a least significant bit and a second-least significant bit of the counter.

13. The switching power supply control circuit according to claim 11, wherein the jitter control circuit disables a most significant bit and a second-most significant bit of the counter.

14. The switching power supply control circuit according to claim 11, wherein the jitter control circuit disables any two bits of the counter other than a least significant bit and a most significant bit of the counter.

15. The control circuit for the switching power supply according to claim 11,
wherein the jitter control circuit includes:
a first comparator that compares a feedback signal with a first reference voltage that has a value that corresponds to one of operating frequencies corresponding to the point of intersection of calculated curves;
a second comparator that compares the feedback signal with a second reference voltage that has a value that corresponds to another one of operating frequencies corresponding to the point of intersection of calculated curves;

first and second tri-state buffers that select a clock signal supplied to two D flip flops to be disabled among nine D flip flops included in the counter or an inverting output signal from a D flip flop to be disabled based on an output from the first comparator and relay a clock signal to a next-stage D flip flop or that block the clock signal; and
first and second selection circuits that supply an inverting output signal from a D flip flop to be disabled to a next-stage D flip flop.

16. The switching power supply control circuit according to claim 11,
wherein the jitter control circuit comprises:
a first comparator that compares a feedback signal with a first reference voltage that has a value that corresponds to one of operating frequencies corresponding to the point of intersection of calculated curves;
a second comparator that compares the feedback signal with a second reference voltage that has a value that corresponds to another one of operating frequencies corresponding to the point of intersection of calculated curves;
a third transistor that is connected in series with a first transistor that is turned on and off based on a bit to be disabled among nine D flip flops included in the counter and that is turned on and off based on an output from the first comparator; and
a fourth transistor that is connected in series with a second transistor that is turned on and off based on a bit to be disabled among the nine D flip flops included in the counter and that is turned on and off based on an output from the second comparator.

17. The switching power supply control circuit according to claim 1, wherein the operating frequency is modulated into a triangular waveform, based on an output from the counter.

18. A switching power supply comprising:
a control circuit that causes a switching element connected to an input voltage source to perform switching to generate and output a predetermined direct-current voltage to a load and that reduces an operating frequency of the switching as a magnitude of the load decreases,
wherein the control circuit includes:
an oscillator that determines the operating frequency by charging a capacitor with a predetermined current based on the magnitude of the load or discharging the capacitor; and
a jitter control circuit that is included in the oscillator and that performs frequency diffusion by modulating the operating frequency with a modulation frequency based on a changeable bit number of a counter,
wherein the jitter control circuit switches the bit number of the counter at an operating frequency corresponding to a point of intersection of calculated curves each of which indicates a conducted electromagnetic interference reduction effect with respect to an operating frequency for each bit number.

* * * * *